US012772319B2

(12) United States Patent
Cheng et al.

(10) Patent No.: US 12,772,319 B2
(45) Date of Patent: Oct. 20, 2026

(54) RELAY LINK SWITCHING OPERATIONS IN WIRELESS COMMUNICATION

(71) Applicant: QUALCOMM Incorporated, San Diego, CA (US)

(72) Inventors: Peng Cheng, Beijing (CN); Karthika Paladugu, Hyderabad (IN); Hong Cheng, Basking Ridge, NJ (US)

(73) Assignee: QUALCOMM Incorporated, San Diego, CA (US)

(*) Notice: Subject to any disclaimer, the term of this patent is extended or adjusted under 35 U.S.C. 154(b) by 223 days.

(21) Appl. No.: 18/554,966

(22) PCT Filed: May 11, 2021

(86) PCT No.: PCT/CN2021/093046
§ 371 (c)(1),
(2) Date: Oct. 11, 2023

(87) PCT Pub. No.: WO2022/236674
PCT Pub. Date: Nov. 17, 2022

(65) Prior Publication Data
US 2024/0205768 A1 Jun. 20, 2024

(51) Int. Cl.
*H04W 76/19* (2018.01)
*H04W 36/00* (2009.01)
(Continued)

(52) U.S. Cl.
CPC ....... *H04W 76/19* (2018.02); *H04W 36/0055* (2013.01); *H04W 36/033* (2023.05);
(Continued)

(58) Field of Classification Search
None
See application file for complete search history.

(56) References Cited

U.S. PATENT DOCUMENTS

2017/0086114 A1 3/2017 Jung et al.
2018/0324848 A1 11/2018 Baghel et al.
(Continued)

FOREIGN PATENT DOCUMENTS

CN 107771410 A 3/2018
CN 108024295 A 5/2018
(Continued)

OTHER PUBLICATIONS

Interdigital Inc: "Service Continuity for L2 UE to NW Relays", 3GPP RAN WG2 Meeting #114, R2-2104872, 3rd Generation Partnership Project, Mobile Competence Centre, 650, Route Des Lucioles, F-06921, Sophia-Antipolis Cedex, France, vol. RAN WG2, No. electronic, May 1, 2021, May 10, 2021, XP052006615, 6 Pages, Chapters 2.1.1 Direct to indirect path switch procedure, Chapter 2.1.2 Indirect to direct path switch procedure.
(Continued)

*Primary Examiner* — Jutai Kao
(74) *Attorney, Agent, or Firm* — Loza & Loza LLP

(57) ABSTRACT

A network entity can trigger a remote user equipment (UE) to switch between an indirect communication link with a network to another indirect communication link or direct communication link with the network. In some aspects, the network entity can trigger the remote UE to perform an inter-gNB switching or sidelink switching using a radio resource control (RRC) connection release procedure or an RRC reconfiguration procedure.

30 Claims, 13 Drawing Sheets

(51) Int. Cl.
*H04W 36/30* (2009.01)
*H04W 36/36* (2009.01)
*H04W 72/25* (2023.01)

(52) U.S. Cl.
CPC ......... *H04W 36/305* (2018.08); *H04W 36/36* (2013.01); *H04W 72/25* (2023.01)

(56) References Cited

U.S. PATENT DOCUMENTS

| | | | | |
|---|---|---|---|---|
| 2021/0051758 | A1 | 2/2021 | Xu et al. | |
| 2021/0136655 | A1* | 5/2021 | Berggren | H04W 28/0226 |
| 2023/0136426 | A1* | 5/2023 | Cheng | H04W 40/24 |
| 2023/0180097 | A1* | 6/2023 | Zhang | H04W 40/22<br>370/315 |
| 2024/0031877 | A1* | 1/2024 | Ji | H04W 76/23 |
| 2024/0049099 | A1* | 2/2024 | Yao | H04W 36/033 |
| 2024/0121677 | A1* | 4/2024 | Wu | H04W 36/0079 |
| 2024/0129820 | A1* | 4/2024 | Mochizuki | H04W 36/08 |
| 2024/0187963 | A1* | 6/2024 | Chen | H04W 40/246 |
| 2024/0205989 | A1* | 6/2024 | Kang | H04W 76/27 |
| 2024/0259906 | A1* | 8/2024 | Freda | H04W 36/305 |

FOREIGN PATENT DOCUMENTS

| | | | |
|---|---|---|---|
| CN | 111901836 | A | 11/2020 |
| EP | 4106399 | A1 | 12/2022 |

OTHER PUBLICATIONS

Supplementary European Search Report—EP21941250—Search Authority—The Hague—Dec. 3, 2024.

Ericsson: "Mobility Aspects of UE-to-Network Relaying", 3GPP TSG-RAN WG2 #91bis, Tdoc R2-154155, Malmo, Sweden, Oct. 5-9, 2015, pp. 1-5, pp. 2-4.

International Search Report and Written Opinion—PCT/CN2021/093046—ISA/EPO—Feb. 10, 2022.

Qualcomm Incorporated: "Remaining Issues on L2 U2N Relay", 3GPP Draft, 3GPP TSG RAN WG2 Meeting #113-e, R2-2100124, 3rd Generation Partnership Project (3GPP), Mobile Competence Centre, 650, Route Des Lucioles, F-06921, Sophia-Antipolis Cedex, France, vol. RAN WG2. No, E-Conference, Jan. 25, 2021-Feb. 5, 2021, Jan. 15, 2021 (Jan. 15, 2021), XP051973341, 23 Pages, The whole document, p. 1-p. 22.

ZTE: "Discussion on the RRC State of Remote UE and Relay UE", 3GPP TSG-RAN WG2 Meeting #96, R2-168199, Reno, USA, Nov. 14-18, 2016, 5 Pages.

* cited by examiner

RELAY LINK SWITCHING OPERATIONS IN WIRELESS COMMUNICATION

CROSS-REFERENCE TO RELATED APPLICATION

This application is the U.S. national stage of PCT patent application number PCT/CN2021/093046 filed on May 11, 2021.

TECHNICAL FIELD

The technology discussed below relates generally to wireless communication systems, and more particularly, to UE-based relay link switching operations in wireless communication.

INTRODUCTION

Communication networks have used relays in varying capacities. Relaying in cellular networks seeks to extend base station coverage, improve transmission reliability, and recover failed links due to, for example, blockage or fading. A relaying node may be a fixed node or a mobile device (e.g., a user equipment (UE)). A remote UE can communicate with a relaying node (e.g., relay UE) using D2D technology. D2D allows UEs to communicate over direct links instead of through cellular network infrastructure. For example, a D2D relay link may be established between a remote UE and a relay UE to enable indirect connection between a base station and the remote UE via the relay UE. A remote UE may switch between indirect connections with the network or between an indirect connection and direct connection with the network in different mobility scenarios.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the disclosure provides a method of wireless communication at a user equipment (UE). The UE receives a radio resource control (RRC) message from a first network entity of a network or a sidelink message from a first relay UE associated with the first network entity. The UE releases, in response to the RRC message or the sidelink message, a connection with the first network entity or the first relay UE associated with the first network entity. The UE establishes a device-to-network (D2N) connection with the first network entity or a second network entity directly or indirectly via a second relay UE according to the RRC message.

One aspect of the disclosure provides a method of wireless communication at a wireless network. A network entity communicates with a user equipment (UE) using a first wireless connection. The network entity transmits, to the UE, a radio resource control (RRC) connection release message (RRCRelease) or an RRC reconfiguration message (RRCReconfiguration) to trigger the UE to disconnect the first wireless connection and establish a second wireless connection with the wireless network. The network entity communicates with the UE using the second wireless connection.

One aspect of the disclosure provides a user equipment (UE) for wireless communication. The UE includes a communication interface configured for wireless communication, a memory, and a processor connected with the communication interface and the memory. The processor and the memory are configured to receive a radio resource control (RRC) message from a first network entity of a network or a sidelink message from a first relay UE associated with the first network entity. The processor and the memory are further configured to release, in response to the RRC message or the sidelink message, a connection with the first network entity or the first relay UE associated with the first network entity. The processor and the memory are further configured to establish a device-to-network (D2N) connection with the first network entity or a second network entity directly or indirectly via a second relay UE according to the RRC message.

One aspect of the disclosure provides a network entity of a wireless network. The network entity includes a communication interface for wireless communication, a memory, and a processor connected with the communication interface and the memory. The processor and the memory are configured to communicate with a user equipment (UE) using a first wireless connection. The processor and the memory are further configured to transmit, to the UE, a radio resource control (RRC) connection release message (RRCRelease) or an RRC reconfiguration message (RRCReconfiguration) to trigger the UE to disconnect the first wireless connection and establish a second wireless connection with the wireless network. The processor and the memory are further configured to communicate with the UE using the second wireless connection.

One aspect of the disclosure provides a network entity of a wireless network. The network entity includes means for communicating with a user equipment (UE) using a first wireless connection. The network entity further includes means for transmitting, to the UE, a radio resource control (RRC) connection release message (RRCRelease) or an RRC reconfiguration message (RRCReconfiguration) to trigger the UE to disconnect the first wireless connection and establish a second wireless connection with the wireless network. The network entity further includes means for communicating with the UE using the second wireless connection.

One aspect of the disclosure provides a user equipment (UE) for wireless communication. The UE includes means for receiving a radio resource control (RRC) message from a first network entity of a network or a sidelink message from a first relay UE associated with the first network entity. The UE further includes means for releasing, in response to the RRC message or the sidelink message, a connection with the first network entity or the first relay UE associated with the first network entity. The UE further includes means for establishing a device-to-network (D2N) connection with the first network entity or a second network entity directly or indirectly via a second relay UE according to the RRC message.

One aspect of the disclosure provides a network entity of a wireless network. The network entity includes means for communicating with a user equipment (UE) using a first wireless connection. The network entity further includes means for transmitting, to the UE, a radio resource control (RRC) connection release message (RRCRelease) or an RRC reconfiguration message (RRCReconfiguration) to trigger the UE to disconnect the first wireless connection and establish a second wireless connection with the wireless network. The network entity further includes means for communicating with the UE using the second wireless connection.

One aspect of the disclosure provides a computer-readable storage medium stored with executable code for wireless communication. The executable code includes instructions for causing a user equipment (UE) to receive a radio resource control (RRC) message from a first network entity of a network or a sidelink message from a first relay UE associated with the first network entity. The executable code further includes instructions for causing a user equipment (UE) to release, in response to the RRC message or the sidelink message, a connection with the first network entity or the first relay UE associated with the first network entity. The executable code further includes instructions for causing a user equipment (UE) to establish a device-to-network (D2N) connection with the first network entity or a second network entity directly or indirectly via a second relay UE according to the RRC message.

One aspect of the disclosure provides a computer-readable storage medium stored with executable code for wireless communication in a wireless network. The executable code includes instructions for causing a network entity to communicate with a user equipment (UE) using a first wireless connection. The executable code further includes instructions for causing a network entity to transmit, to the UE, a radio resource control (RRC) connection release message (RRCRelease) or an RRC reconfiguration message (RRCReconfiguration) to trigger the UE to disconnect the first wireless connection and establish a second wireless connection with the wireless network. The executable code further includes instructions for causing a network entity to communicate with the UE using the second wireless connection.

These and other aspects of the present disclosure will become more fully understood upon a review of the detailed description, which follows. Other aspects and features will become apparent to those of ordinary skill in the art, upon reviewing the following description of specific, exemplary implementations in conjunction with the accompanying figures. While features may be discussed relative to certain examples and figures below, all implementations can include one or more of the advantageous features discussed herein. In other words, while one or more examples may be discussed as having certain advantageous features, one or more of such features may also be used in accordance with the various examples discussed herein. In similar fashion, while examples may be discussed below as device, system, or method implementations, it should be understood that such examples can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to indirect link switching operations in wireless communication using UE-based procedures. A remote user equipment (UE) can communicate with a network entity using an indirect link via a relay UE. The network entity can trigger the remote UE to switch between indirect links using a radio resource control (RRC) connection release procedure or an RRC reconfiguration procedure.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described implementations. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
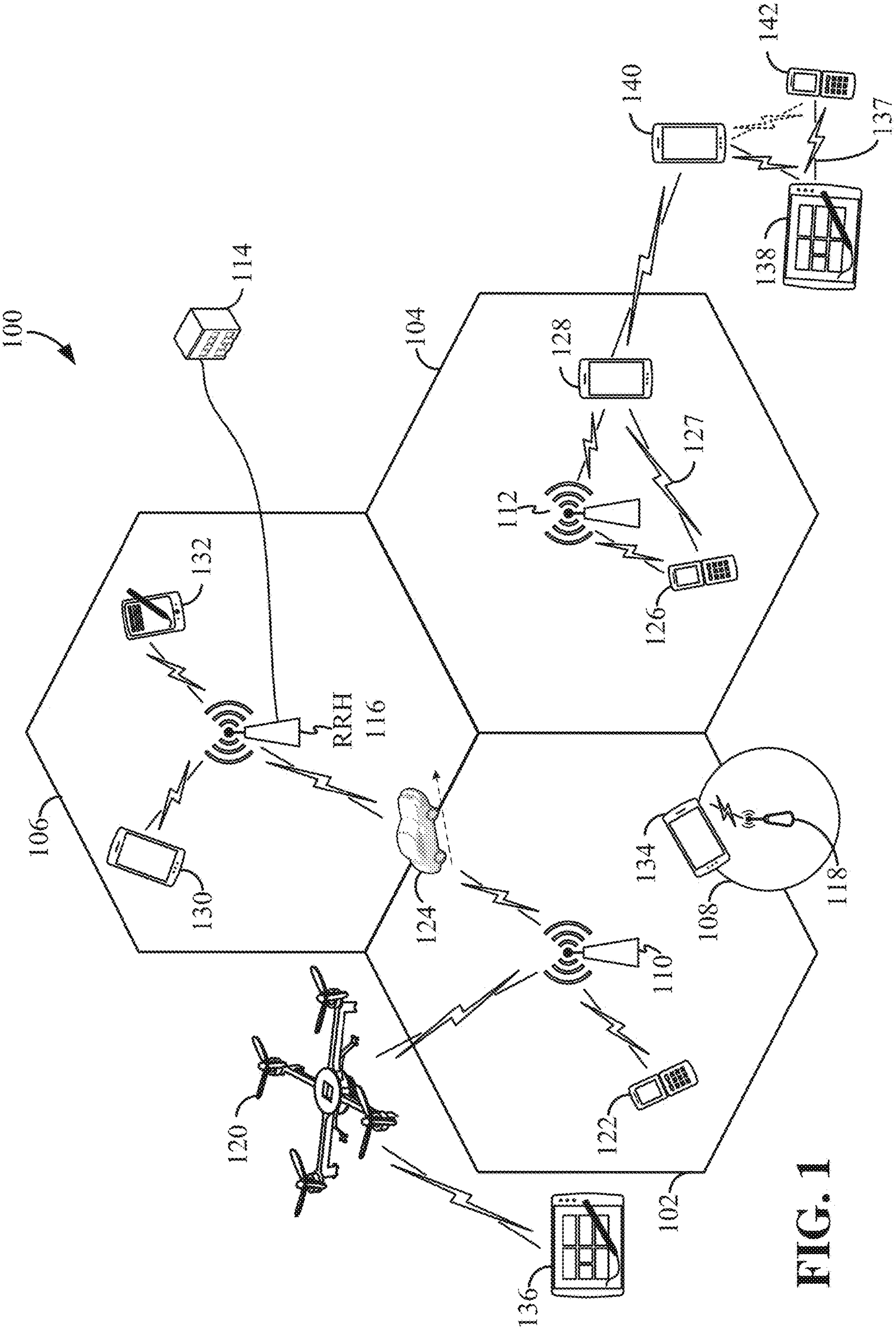
FIG. 1 is an illustration of an example of a radio access network according to some aspects of the disclosure.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a radio access network (RAN) 100. The RAN 100 may implement any suitable wireless communication technology or technologies to provide radio access to a mobile apparatus. As one example, the RAN 104 may operate according to 3$^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using direct link (e.g., sidelink) signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relaying on scheduling or control information from a base station. In other examples, two or more UEs (e.g., UEs 126 and 128) within the coverage area of a base station (e.g., base station 112) may also communicate direct link signals 127 over a direct link (e.g., sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, an Internet of Everything (IoT) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

The sidelink communication between UEs 126 and 128 may occur over a sidelink 127 utilizing a proximity service (ProSe) PC5 interface. The PC5 interface may be utilized to support D2D sidelink communication in V2V and V2X networks, along with various other D2D proximity use cases. Examples of other proximity use cases include, but are not limited to, public safety or commercial (e.g., entertainment, education, office, medical, and/or interactive)

based proximity services. ProSe communication may further support different operational scenarios, such as in-coverage, out-of-coverage, and partial coverage. Out-of-coverage refers to a scenario in which the UEs are outside of the coverage area of a base station (e.g., base station 112), but each are still configured for ProSe communication. Partial coverage refers to a scenario in which some of the UEs are outside of the coverage area of the base station, while other UEs are in communication with the base station. In-coverage refers to a scenario, as shown in FIG. 1, in which UEs (e.g., UEs 126 and 128) are in communication with the base station 112 (e.g., gNB) via a Uu (e.g., cellular interface) connection to receive ProSe service authorization and provisioning information to support ProSe operations. ProSe communication may further utilize a licensed spectrum or an unlicensed spectrum.

In some aspects, a direct link may be a sidelink (e.g., PC5), Bluetooth, Wi-Fi, or other suitable D2D or P2P link. For example, UEs 138, 140, and 142 may be D2D or P2P devices (e.g., Bluetooth, Zigbee, Wi-Fi, or Near Field Communication (NFC) devices) communicating over a direct link (e.g., a D2D or P2P carrier). For example, UEs 138, 140, and 142 may be Bluetooth devices that communicate over a short-wavelength (e.g., 2.45 GHZ) carrier. Each Bluetooth device 138, 140, and 142 may operate at low power (e.g., 100 mW or less) to communicate over a short-range distance (e.g., 10 meters or less). In a Bluetooth network, the UEs 138, 140, and 142 may form an ad-hoc piconet and each pair of UEs (e.g., UEs 138 and 140; UEs 138 and 142; and UEs 140 and 142) may communicate over a different frequency in a frequency-hopping manner. Within the piconet, one of the UEs (e.g., UE 138) may function as the master, while the other UEs (e.g., UEs 140 and 142) function as slaves. Each of the UEs 138, 140, and 142 may automatically detect and connect to one another.

In the RAN 100, the ability for a UE to communicate while moving, independent of its location, is referred to as mobility. The various physical channels between the UE and the radio access network are generally set up, maintained, and released under the control of an access and mobility management function (AMF), which may include a security context management function (SCMF) and a security anchor function (SEAF) that perform authentication. The SCMF can manage, in whole or in part, the security context for both the control plane and the user plane functionality.

In various aspects of the disclosure, the RAN 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the RAN 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Further, the air interface in the RAN 100 may utilize one or more multiplexing and multiple access algorithms to enable simultaneous communication of the various devices. For example, 5G NR specifications provide multiple access for UL transmissions from UEs 122 and 124 to base station 110, and for multiplexing for DL transmissions from base station 110 to one or more UEs 122 and 124, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
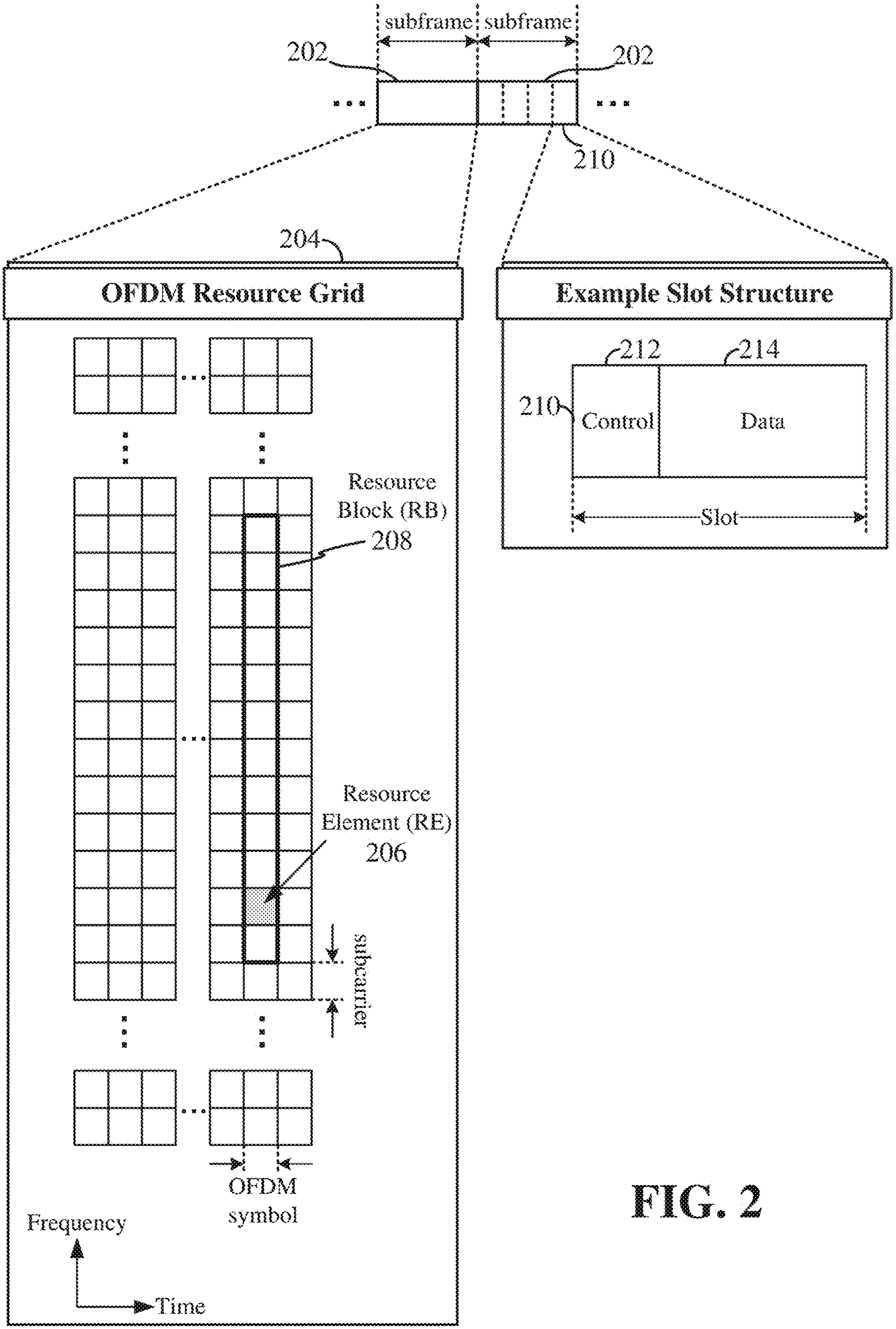
FIG. 2 is a schematic illustration of an organization of wireless resources in an air interface utilizing orthogonal frequency divisional multiplexing (OFDM) according to some aspects of the disclosure.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a network entity, such as a base station (e.g., gNB, eNB, etc.), or may be self-scheduled by a UE implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels.

Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the network entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the network entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the network entity to schedule uplink transmissions. Here, in response to the SR transmitted on the UCI, the network entity may transmit downlink control information (DCI) that may schedule resources for uplink packet transmissions. UCI may also include HARQ feedback, channel state feedback (CSF), such as a CSI report, or any other suitable UCI.

In some aspects, a UE can transmit a buffer status report (BSR) to provide the base station within information regarding the volume of uplink data waiting to be transferred. A BSR can be sent on the PUSCH using a medium access control (MAC) control element (CE). The provision of a BSR helps the base station to allocate an appropriate quantity of air-interface resources (e.g., RBs 208).

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of direct link communication over a sidelink carrier via a proximity service (ProSe) PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIGS. 1 and 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
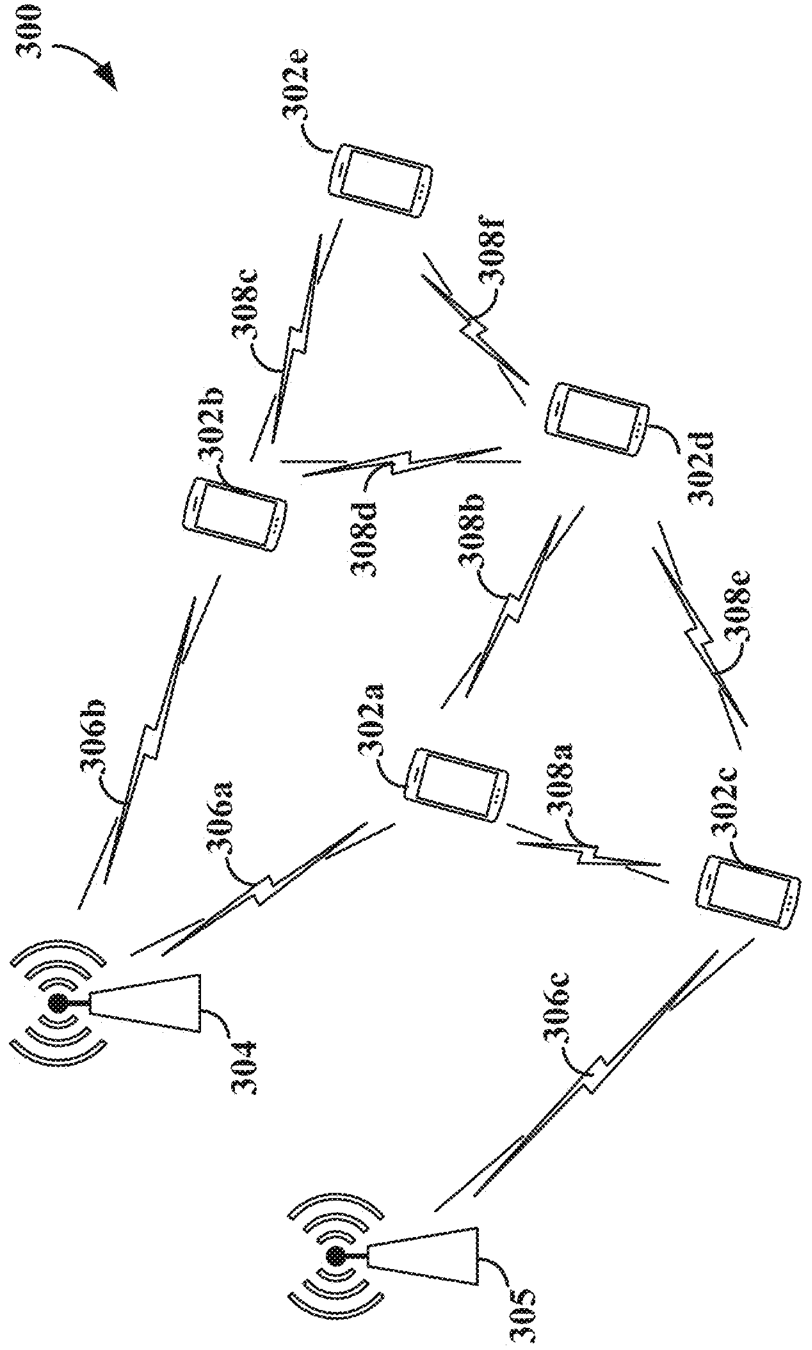
FIG. 3 is a schematic illustration of an exemplary wireless communication network employing sidelink relaying according to some aspects of the disclosure.

FIG. 3 is a diagram illustrating an exemplary wireless communication network 300 employing relay or indirect connections. The wireless communication network 300 may correspond, for example, to the RAN 100 illustrated in FIG. 1. The wireless communication network 300 may include network entities 304 and 305 (e.g., a base station, eNB, or gNB) in wireless communication with one or more wireless communication devices (e.g., UEs 302*a*, 302*b*, 302*c*, 302*d*, and 302*e*). In the example shown in FIG. 3, the network entity 304 may communicate with at least UEs 302*a* and 302*b* via a respective Uu wireless communication link 306*a* and 306*b*, and the network entity 305 may communicate with at least UE 302*c* via a direct Uu wireless communication link 306*c*. In some examples, the network entity 304 may further have an indirect Uu link with one or more of remote UEs (e.g., UEs 302*c*, 302*d*, and/or 302*c*), and the network entity 305 may have an indirect Uu wireless communication link with remote UE 302*d* via relay UE 302*c*. Each of the Uu wireless communication links 306*a*, 306*b*, and 306*c* may utilize a sub-6 GHZ carrier frequency or a mmWave carrier frequency. In some examples, one or more UEs (e.g., UEs 302*c*, 302*d*, and 302*c*) may not have a Uu connection with the network entity 304.

In addition, respective D2D relay links (sidelinks) 308*a*-308*f* may be established between various UEs to enable relaying of information between the network entity 304/305 and one or more remote UEs, such as UEs 302*c*-302*e*, or between a remote UE (e.g., UE 302*c*) and a destination UE (e.g., UE 302*c*). For example, relay link 308*a* may be established between UE 302*c* and UE 302*a*, relay link 308*b* may be established between UE 302*d* and UE 302*a*, relay link 308*c* may be established between UE 302*c* and 302*b*, relay link 308*d* may be established between UE 302*d* and UE 302*b*, relay link 308*e* may be established between UE 302*c* and UE 302*d*, and relay link 308*f* may be established between UE 302*d* and UE 302*e*. Each relay link 308*a*-308*f* may utilize decode and forward (DF) relaying, amplify and forward (AF) relaying, or compress and forward (CF) relaying. For DF relaying, HARQ feedback may be provided from the receiving device to the transmitting device. The sidelink communication over the relay links 308*a*-308*d* may be carried, for example, in a licensed frequency domain using radio resources operating according to a 5G NR or NR sidelink (SL) specification and/or in an unlicensed frequency domain, using radio resources operating according to 5G new radio-unlicensed (NR-U) specifications.

The relay links 308*a*-308*f* may be established due to, for example, distance or signal blocking between the network entity 304/305 (or destination UE) and a remote UE (e.g., UE 302*d* or 302*e*), weak receiving capability of the remote UE, low transmission power of the remote UE, limited battery capacity of the remote UE, and/or to improve link diversity. Thus, the relay links 308*a*-308*f* may enable communication between the network entity 304/305 and a remote UE (e.g., UE 302*d* or 302*c*) to be relayed via one or more relay UEs (e.g., UEs 302*a*-302*d*) over Uu wireless communication links (e.g., the Uu interface) 306*a*-306*c* and relay links (e.g., sidelinks) 308*a*-308*f*. In other examples, the relay links 308*a*-308*f* may enable sidelink communication to be relayed between a remote UE 302*e* and another destination UE (e.g., UE 302*c*) over various relay links.

In some examples, a common carrier may be shared between the sidelinks 308*a*-308*f* and Uu links 306*a* and 306*b*, such that resources on the common carrier may be allocated for both sidelink communication between wireless communication devices 302*a*-302*e* and cellular communication (e.g., uplink and downlink communication) between the wireless communication devices 302*a*-302*e* and the network entity 304. For example, the wireless communication network 300 may be configured to support a Mode 1 sidelink network in which resources for both sidelink and cellular communication are scheduled by the network entity 304 (e.g., a base station or gNB). In other examples in which Mode 2 sidelink is implemented on the sidelinks 308*a*-308*f*, the wireless communication devices 302*a*-302*e* may autonomously select sidelink resources (e.g., from one or more frequency bands or sub-bands designated for sidelink communication) for communication therebetween. In some examples, the remote UE 302*e* or other scheduling entity (e.g., UE 302*a*) may select the sidelink resources for relaying communication between the remote UE 302*e* and other relay UEs 302*a*-302*d*. In examples in which the relay communication is between the remote UE 302*e* and a destination UE (e.g., UE 302*c*), the sidelink resources for relaying may be selected by the network entity 304 in a Mode 1 configuration or by the remote UE 302*e* or the destination UE 302*c* in a Mode 2 configuration.

A remote UE (e.g., UE 302*d*) may generally connect to a source relay UE (e.g., UE 302*a* or UE 302*c*) via a layer 3 (L3) connection with no Uu connection with (and no visibility to) the network or via a layer 2 (L2) connection where the remote UE supports Uu access stratum (AS) and non-AS connections (NAS) with the network. When there is no direct connection path (Uu connection) between the remote UE and the network entity (e.g., an L3 connection), the remote UE is connected to the relay UE via a PC5 connection only (e.g., Layer 3 UE-to-NW). In this example, the relay UE may report to the 5G core network (5GC) about the remote UE's presence. In other examples, the remote UE may be visible to the 5GC via a non-3GPP interworking function (N3IWF). When there is a direct connection path between the remote UE and the network entity (e.g., an L2 connection), the remote UE may support the NR Uu AS and NAS connections above the PC5 radio link control (RLC) layer. The NG-RAN (e.g., network entity 304 or 305) may control the remote UE's PC5 link via NR radio resource control (RRC) signaling.

In some aspects, a remote UE (e.g., UE 302*d*) may need to perform switching between indirect connections with the network in various mobility scenarios. The remote UE 302*d* can communicate with a network entity 304/305 using an indirect path via a relay UE (e.g., UE 302*a*-302*c*). In one example, the remote UE may need to change its indirect connection from a first network entity 304 to a second network entity 305 (e.g., inter-gNB handover). In one example, the remote UE may need to change a sidelink connection (PC5 link) from a first relay UE (e.g., UE 302*a*)

to a second relay UE (e.g., UE 302*c*) (e.g., PC5-to-PC5 handover). In one example, the remote UE may need to change its indirect connection with a first network entity 304 to a direct connection with a second network entity 305. Various aspects discussed herein provide various procedures to facilitate UE-based indirect connection switching without relying on control signaling between network entities (e.g., base stations).

Figure 4:
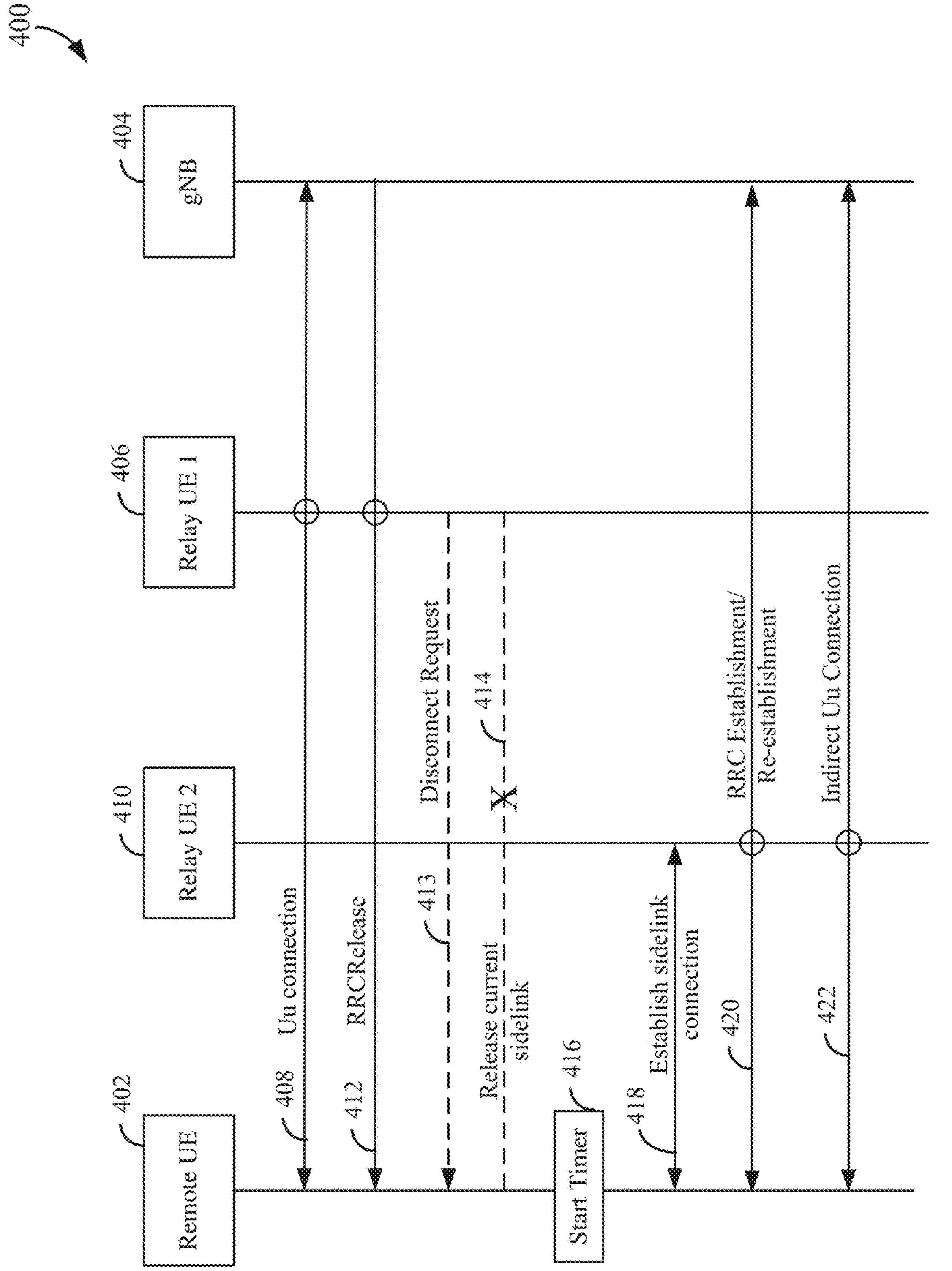
FIG. 4 is a schematic illustration of a first indirect link switching procedure triggered using a radio resource control (RRC) connection release message according to some aspects of the disclosure.

FIG. 4 is a schematic illustration of a first indirect link switching procedure 400 using an RRC connection release message according to some aspects of the disclosure. A remote UE 402 may have an indirect connection with a network entity (e.g., gNB 404) via a first relay UE 406. For example, the remote UE 402 may have an indirect Uu connection 408 with the gNB 404. The remote UE 402 may be one of the remote UEs described above in relation to FIG. 3. Based on measurements and/or reports received from the UEs (e.g., first relay UE 406), the gNB 404 can trigger the remote UE 402 to switch to a different indirect link with the network. For example, the gNB 404 can switch the remote UE 402 from the first relay UE 406 to a second relay UE 410. For example, the remote UE 402 may have moved to a new location and/or the signal quality from the second relay UE 410 may exceed that from the first relay UE 406.

To initiate the switching, the gNB 404 can transmit an RRC connection release message (RRCRelease 412) to the remote UE 402. The RRCRelease 412 can trigger the remote UE 402 to establish an RRC connection via another relay UE that may be served by the same gNB or a different gNB. In some aspects, the gNB 404 can provide redirection information in the RRCRelease 412 to facilitate UE-based switching to a new relay UE connection. In one example, the RRCRelease 412 can include one or more information elements that provide target relay UE identifier and timer information. In some aspects, the RRCRelease 412 can further provide information on the carrier frequency, frequency band, or BWP used by the target relay UE. If frequency information is not included in the RRCRelease 412, the remote UE 402 can assume the same frequency, frequency band, or BWP is used by the new relay UE. In some aspects, the RRCRelease 412 can indicate whether the target relay UE (e.g., relay UE 410) is served by the same or different network entity (e.g., gNB). In one example, the RRCRelease 412 can include an indication (e.g., a 1-bit field or information element (IE)) to indicate whether the relay UE is associated with the same gNB or a different gNB. In one example, the RRCRelease 412 can include the serving cell ID of the target relay UE if the target relay UE is associated with a gNB that is different from that of the current relay UE. In some aspects, the RRCRelease 412 can provide information on a priority order for selecting a relay UE or a network entity for an RRC establishment procedure or an RRC re-establishment procedure.

In some aspects, the first relay UE 406 can transmit a disconnect request message 413 to the remote 402. In one example, the disconnect request message 413 may be a PC5-S message. The disconnect request message 413 can cause the remote UE 402 to release the sidelink connection with the first relay UE 406. The disconnect request message 413 can be triggered by a cell reselection, a handover, or a radio link failure occurred at the first relay UE 406.

In response to the RRCRelease 412, the remote UE 402 can release the current sidelink connection 414 (e.g., PC5 connection) with the first relay UE 406 and trigger a sidelink connection establishment procedure. For example, the remote UE 402 can start a timer 416 and perform a unicast PC5 connection establishment procedure 418 to establish a sidelink connection with the target relay UE (e.g., second relay UE 410). If the target relay UE is suitable for switching, the remote UE 402 can establish a sidelink connection (e.g., a unicast PC5 connection) with the target relay UE. In some examples, the remote UE 402 can determine that the target relay UE is suitable if the target relay UE can satisfy a certain signal quality threshold (e.g., PC5 reference signal received power (RSRP)) and/or upper layer criteria.

After establishing a sidelink connection with the target relay UE 410, the remote UE 402 can trigger an RRC establishment or re-establishment procedure 420 with the gNB 404 via the target relay UE 410. Then, the remote UE 402 can stop the running timer 416 after successfully establishing an indirect Uu connection 422 with the gNB 404. The remote UE 402 can obtain UE context from the gNB 404 if RRC establishment or re-establishment is successful. If the remote UE 402 cannot establish or re-establish an RRC connection with the gNB 404 before the timer expires, the remote UE can perform a relay UE selection procedure to select a new target UE that is not restricted to the relay UE indicated in the RRCRelease 412.

Figure 5:
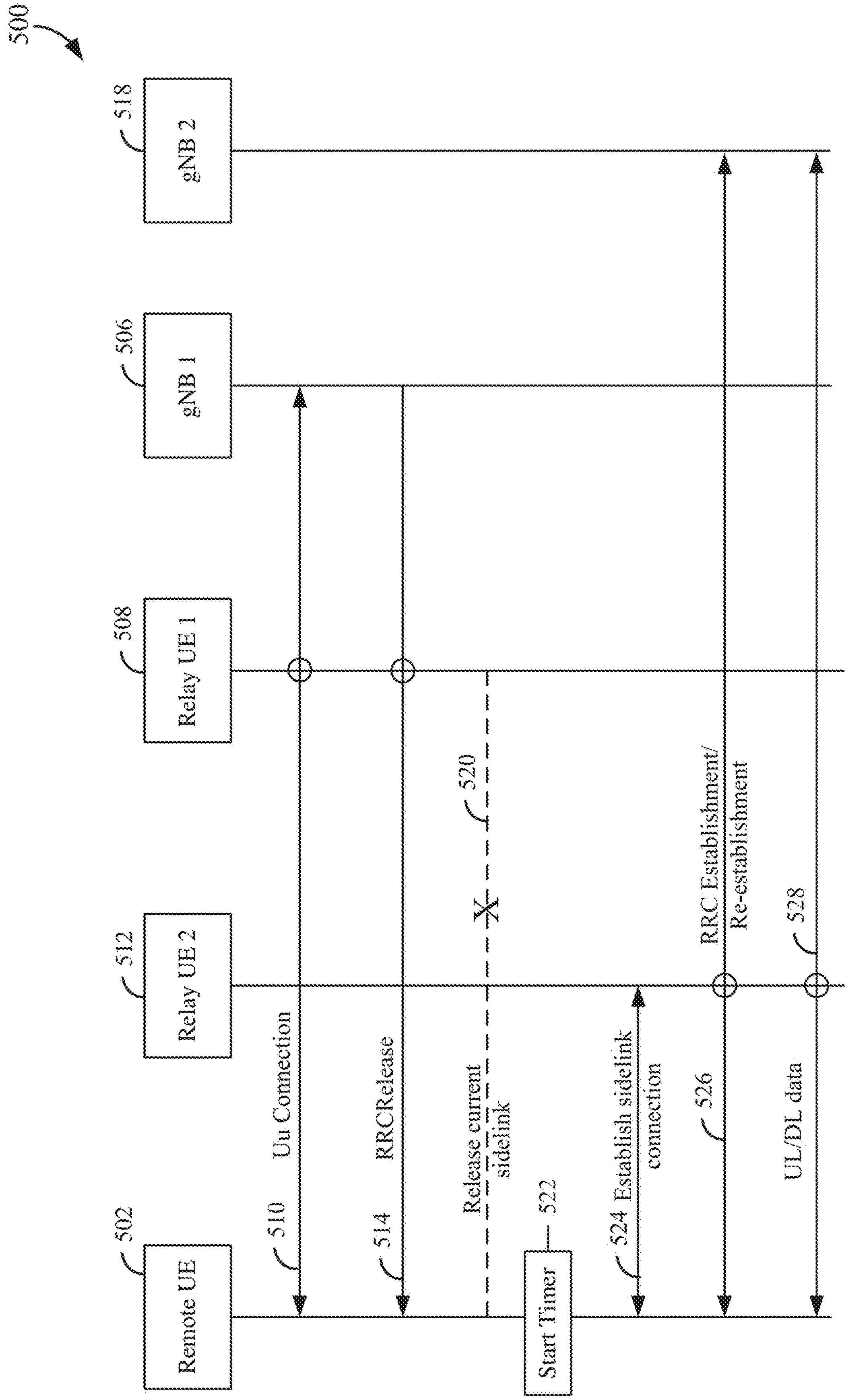
FIG. 5 is a schematic illustration of a second indirect link switching procedure triggered using an RRC connection release message according to some aspects of the disclosure.

FIG. 5 is a schematic illustration of a second indirect link switching procedure 500 using an RRC connection release message according to some aspects of the disclosure. A remote UE 502 may have an indirect connection with a first network entity (e.g., first gNB 506) via a first relay UE (e.g., relay UE 508). For example, the remote UE 502 may have an indirect Uu connection 510 with the gNB 506 via the relay UE 508. The remote UE 502 may be one of the remote UEs described above in relation to FIG. 3. In some aspects, based on measurements and/or reports received from the associated UEs (e.g., first relay UE 508), the gNB 506 can trigger the remote UE 502 to switch an indirect connection from the first relay UE 508 to a new relay UE (e.g., second relay UE 512). For example, the remote UE 502 may have moved to a new location and/or the signal quality from the second relay UE 512 exceeds that from the first relay UE 508.

To initiate the switching, the first gNB 506 can transmit an RRC connection release message (RRCRelease 514) to the remote UE 502. The RRCRelease 514 can redirect the remote UE 502 to establish an RRC connection via a new relay UE (e.g., second relay UE 512) that may be served by a different gNB (e.g., second gNB 518). In some aspects, the first gNB 506 can provide redirection information in the RRCRelease 514 to facilitate UE-based switching to a new relay UE associated with a different gNB. In one example, the RRCRelease 514 can include one or more information elements that provide target relay UE identifier and timer information. The RRCRelease 514 may be similar to the RRCRelease 412 described above in relation to FIG. 4. Therefore, redundant description of the RRCRelease 514 is omitted.

In response to the RRCRelease 514, the remote UE 502 can release the current sidelink connection 520 (e.g., PC5 connection) with the first relay UE 508 and trigger a sidelink connection establishment procedure. For example, the remote UE 502 can start a timer 522 and perform a unicast PC5 connection establishment procedure 524 to establish a sidelink connection with the target relay UE (e.g., second relay UE 512). If the target relay UE is suitable for switching, the remote UE 502 can establish a sidelink connection (e.g., a unicast PC5 connection) with the target relay UE. In some examples, the remote UE 502 can determine that the target relay UE is suitable if the target relay UE can satisfy a certain signal quality threshold (e.g., PC5 reference RSRP) and/or upper layer criteria.

After establishing a sidelink connection with the target relay UE 512, the remote UE 502 can trigger an RRC establishment or re-establishment procedure 526 with the second gNB 518 via the new relay UE 512. Then, the remote UE 502 can stop the running timer 522 after successfully establishing an indirect Uu connection 528 with the new gNB 518. If the remote UE 502 cannot establish an RRC connection with the gNB 518 before the timer expires, the remote UE 502 can perform a relay UE selection procedure to select a new target relay UE that is not restricted to the relay UE indicated by the RRCRelease 514.

Figure 6:
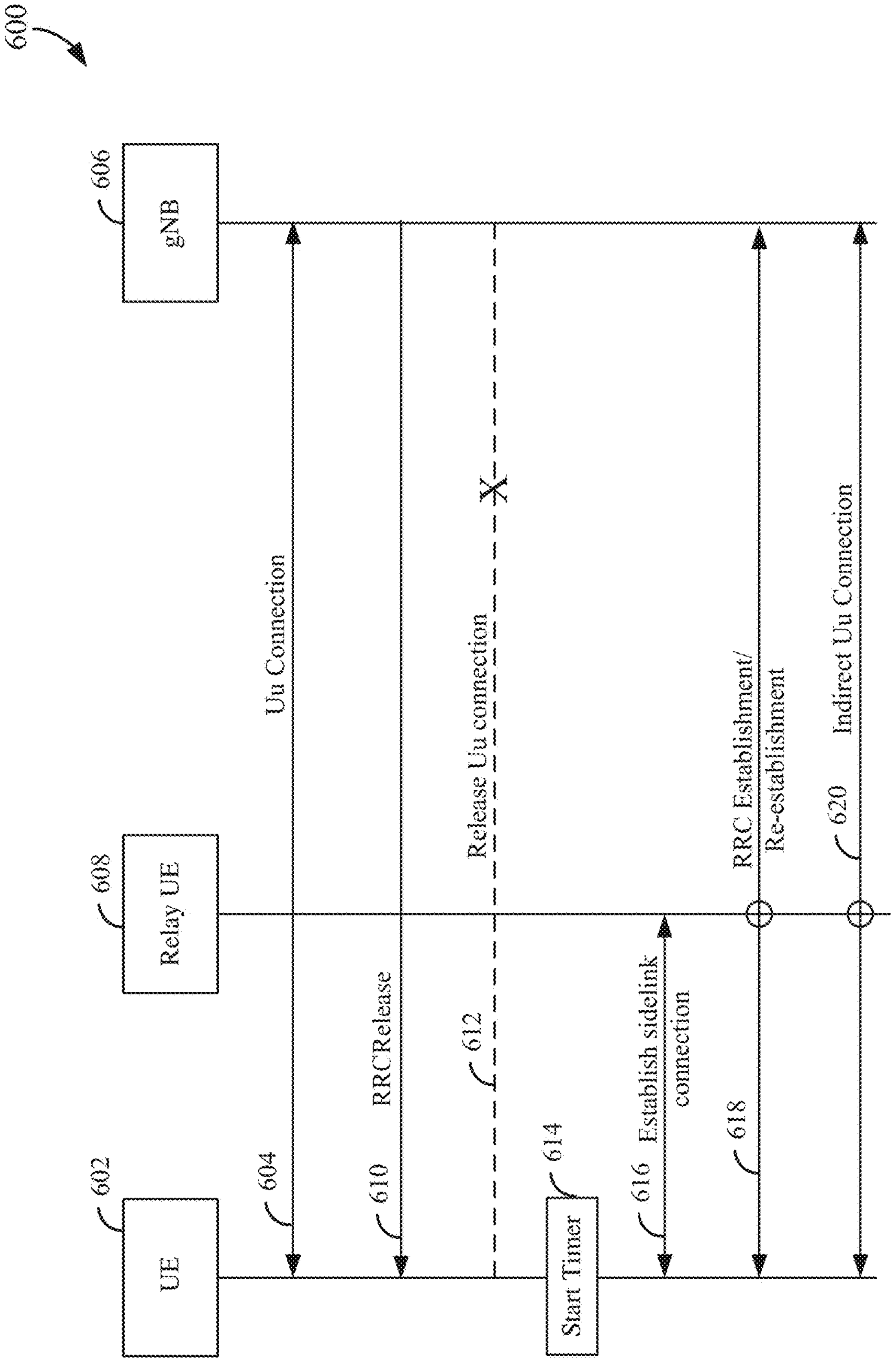
FIG. 6 is a schematic illustration of a third indirect link switching procedure triggered using an RRC connection release message according to some aspects of the disclosure.

FIG. 6 is a schematic illustration of a third indirect link switching procedure 600 using an RRC connection release message according to some aspects of the disclosure. A UE 602 may have a direct connection (e.g., Uu connection 604) with a network entity (e.g., gNB 606). The UE 602 may be one of the UEs described above in relation to FIG. 3. Based on measurements and/or reports received from the associated UEs (e.g., UE 602 and relay UE 608), the gNB 606 can trigger the UE 602 to switch from the direct Uu connection 604 to an indirect Uu connection via a relay UE (e.g., relay UE 608). For example, the UE 602 may have moved to a new location and/or the signal quality from the relay UE 608 exceeds that from the gNB 606.

To initiate the switching, the gNB 606 can transmit an RRC connection release message (RRCRelease 610) to the UE 602. The RRCRelease 610 can redirect the UE 602 to establish an RRC connection with the gNB 606 via the relay UE 608. In some aspects, the gNB 606 can provide redirection information in the RRCRelease 610 to facilitate UE-based switching from a direct connection to an indirect connection via a relay UE. In one example, the RRCRelease 610 can include one or more information elements that provide target relay UE identifier and timer information. The RRCRelease 610 may be similar to the RRCRelease 412 described above in relation to FIG. 4. Therefore, a redundant description of the RRCRelease 610 is omitted.

In response to the RRCRelease 610, the UE 602 can release the current direct connection 612 (e.g., direct Uu connection) with the gNB 606 and trigger a sidelink connection establishment procedure. For example, the UE 602 can start a timer 614 and perform a unicast PC5 connection establishment procedure 616 to establish a sidelink connection with the target relay UE (e.g., relay UE 608). If the target relay UE is suitable for switching, the UE 602 can establish a sidelink connection (e.g., a unicast PC5 connection) with the target relay UE 608. In some examples, the UE 602 can determine that the target relay UE is suitable if the target relay UE can satisfy a certain signal quality threshold (e.g., PC5 reference signal received power (RSRP)) and/or upper layer criteria.

After establishing a sidelink connection with the relay UE 608, the UE 602 can trigger an RRC establishment or re-establishment procedure 618 with the gNB 606 via the relay UE 608. Then, the UE 602 can stop the running timer after successfully establishing an indirect Uu connection 620 with the gNB 606. The UE can obtain UE context from the gNB 606 if RRC establishment or re-establishment is successful. If the UE 602 cannot establish or re-establish an RRC connection with the gNB 606 before the timer expires, the UE 602 can perform a relay UE selection procedure to select a new relay UE that is not restricted to the target relay UE indicated by the RRCRelease 610.

Figure 7:
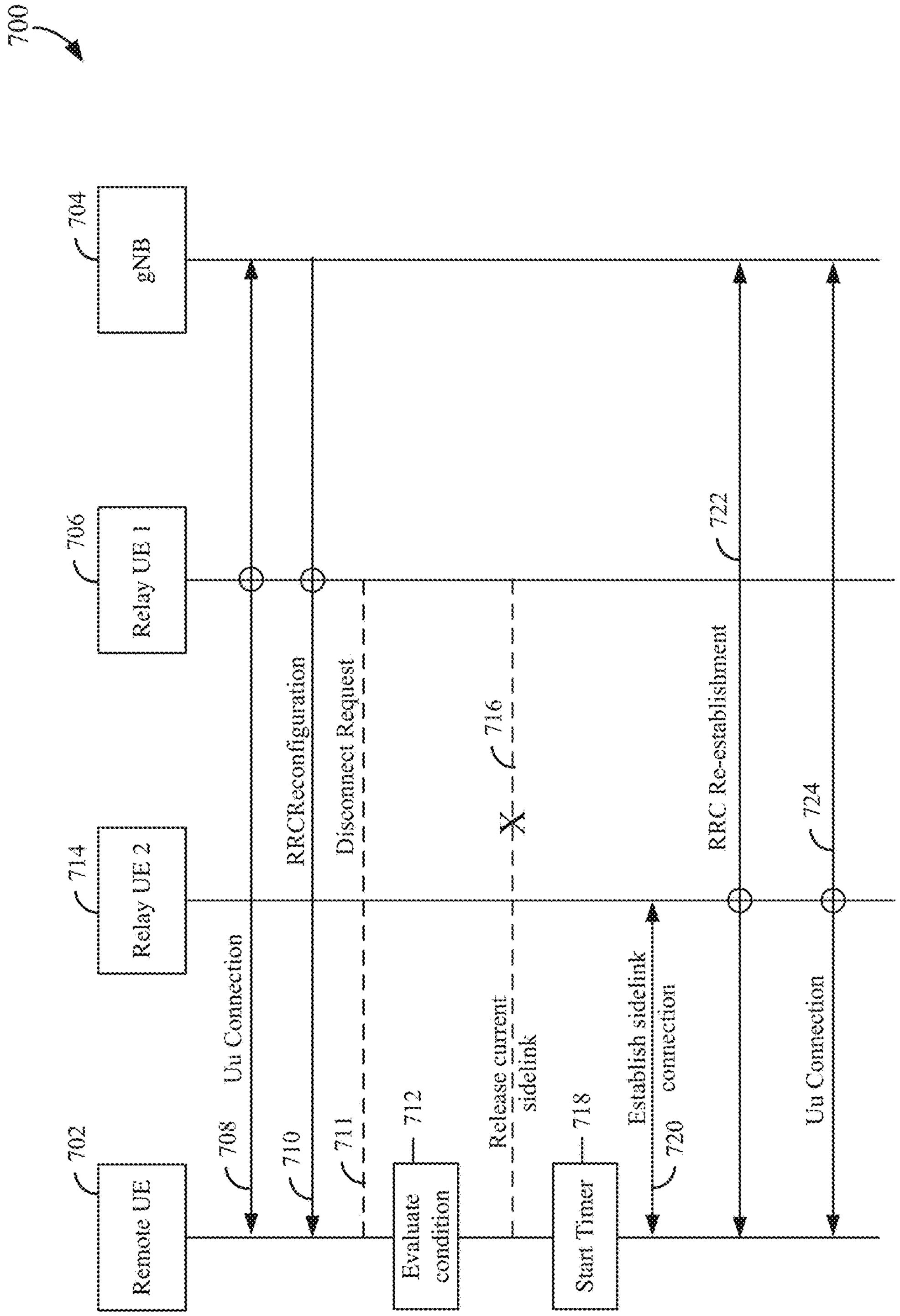
FIG. 7 is a schematic illustration of a first indirect link switching procedure triggered using an RRC reconfiguration message according to some aspects of the disclosure.

FIG. 7 is a schematic illustration of a first remote UE switching procedure 700 using UE-based RRC reconfiguration according to some aspects of the disclosure. A remote UE 702 may have an indirect connection with a network entity (e.g., gNB 704) via a first relay UE 706. For example, the remote UE 702 may have an indirect Uu connection 708 with the gNB 704. The remote UE 702 may be one of the remote UEs described above in relation to FIG. 3. Based on measurements and/or reports received from the associated UEs, the gNB 704 can trigger the remote UE 702 to switch to a target relay UE and/or a target gNB.

To initiate the switching, the gNB 704 can transmit an RRC reconfiguration message (RRCReconfiguration 710) to the remote UE 702. The gNB can use the RRCReconfiguration 710 to modify an RRC connection. In some aspects, the RRCReconfiguration 710 can trigger the remote UE 702 to perform an RRC re-establishment procedure via a new relay UE (served by the same gNB or different gNB) or directly with a gNB. In some aspects, the RRCReconfiguration 710 can include timer information for setting up a timer for monitoring indirect link switching operations at the remote UE 702. In some aspects, the RRCReconfiguration 710 can include information on candidate relay(s) and/or candidate gNB(s). For example, the RRCReconfiguration 710 can provide a list of candidate relay identifiers and/or a list of candidate gNB identifiers. In some aspects, the RRCReconfiguration 710 can include an execution condition for triggering the UE to perform the RRC re-establishment procedure with a gNB (e.g., gNB 704) directly or via a relay UE. The execution condition may indicate a priority for a certain relay UE and/or gNB for the RRC re-establishment procedure. For example, the RRCReconfiguration 710 can configure a priority for a relay UE in the same cell, a relay UE in a different cell, a same gNB, or a different gNB.

In some aspects, the first relay UE 706 can transmit a disconnect request message 711 to the remote 702. In one example, the disconnect request message 711 may be a PC5-S message. The disconnect request message 713 can cause the remote UE 702 to release the sidelink connection with the first relay UE 706. The disconnect request message 711 can be triggered by a cell reselection, a handover, or a radio link failure occurred at the first relay UE 706.

In response to the RRCReconfiguration 710, the remote UE 702 can evaluate an execution condition 712 for performing an RRC re-establishment procedure. The execution condition can be preconfigured or provided by the RRCReconfiguration 710 as described above. In one example, a first execution condition is met when the RSRP of a neighbor relay UE (e.g., second relay UE 714) is greater than the serving relay UE (e.g., first relay UE 706) by more than a threshold. In one example, a second execution condition is met when the RSRP of a neighbor relay UE or a cell (e.g., gNB) is greater than a first threshold and the RSRP of the serving relay UE is less than a second threshold. In one aspect, the remote UE 702 can consider the execution condition 712 is satisfied if either the first execution condition or second execution condition is met. In another aspect, the remote UE 702 can consider the execution condition 712 is satisfied if both the first execution condition and second execution condition are met.

When the execution condition 712 is met, the remote UE 702 can release the current sidelink connection 716 (e.g., PC5 connection) with the first relay UE 706. Then, the remote UE 702 can start a timer 718 and trigger an RRC re-establishment procedure for the target relay UE or gNB. In one example, the RRCReconfiguration 710 can cause the remote UE 702 to perform the RRC re-establishment procedure via a target relay UE. In this case, the remote UE 702 can establish a sidelink connection with the target relay UE. For example, the remote UE 702 can perform a unicast PC5 connection establishment procedure 720 to establish a sidelink connection with the second relay UE 714. After establishing a connection with the target relay UE 714, the remote UE 702 can perform an RRC re-establishment procedure 722 with the gNB via the target relay UE 714. In some aspects, the first relay UE 706 and the second relay UE 714 can be served by the same gNB or different gNBs. In some aspects, if the RRCReconfiguration 710 does not provide information on the target relay UE and/or gNB, the remote UE 702 can trigger the RRC re-establishment procedure via a relay UE or gNB selected by the UE autonomously (i.e., not selected by the gNB 704).

After successfully establishing a Uu connection 724 with the gNB, the remote UE 702 can stop the running timer 718. Then, the remote UE 702 can obtain UE context from the gNB if RRC re-establishment is successful. If the remote UE 702 cannot re-establish the RRC connection with the gNB before the timer expires, the remote UE 702 can perform a relay UE selection procedure to select a new target UE that is not restricted to the relay UE indicated by the RRCReconfiguration 710. At any time, the remote UE 702 can report whether the UE is out of the coverage of a gNB, for example, by sending an RRC message (e.g., a sidelinkUEinformationNR) over a Uu connection if available.

Figure 8:
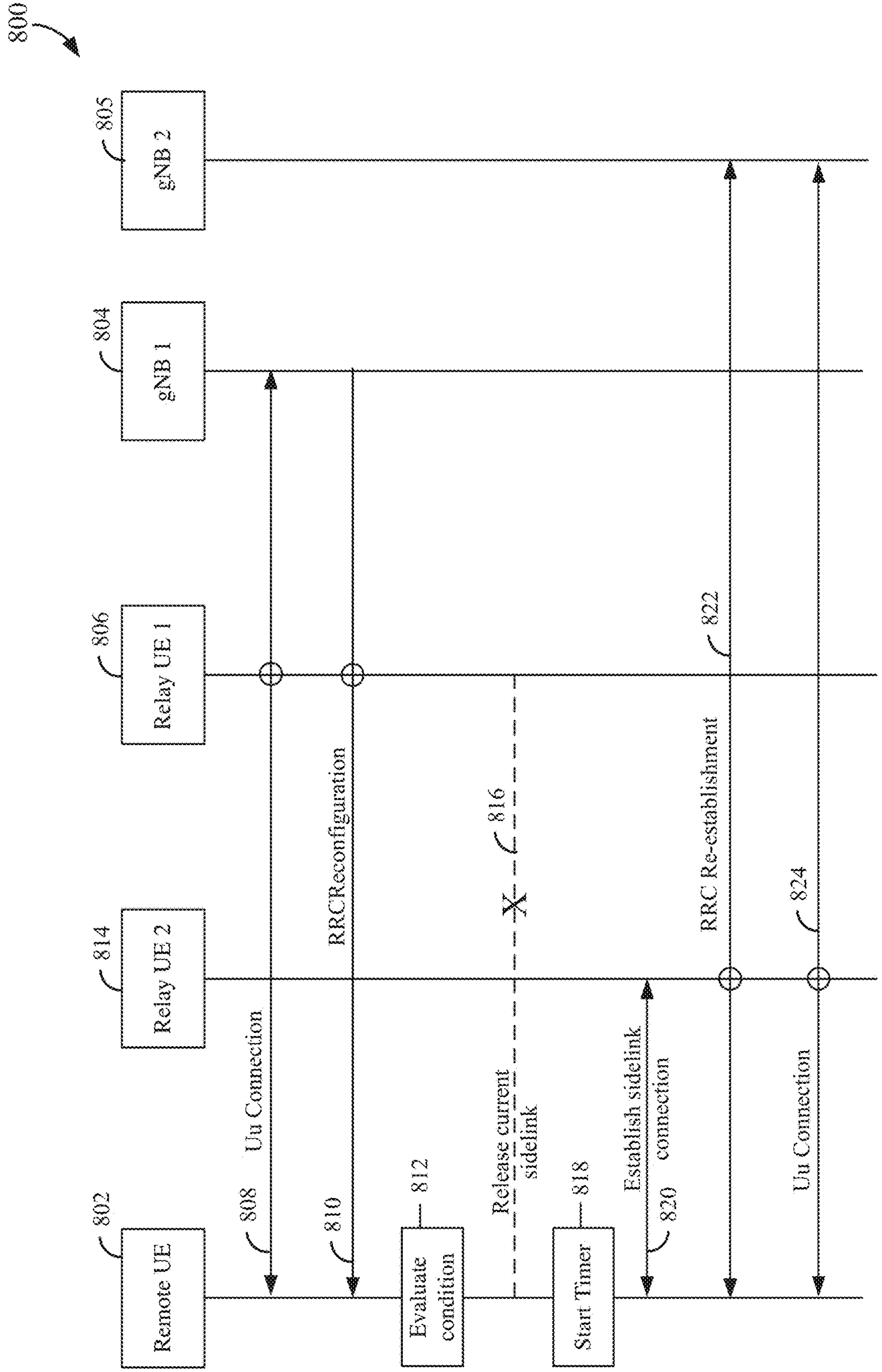
FIG. 8 is a schematic illustration of a second indirect link switching procedure triggered using an RRC reconfiguration message according to some aspects of the disclosure.

FIG. 8 is a schematic illustration of a second indirect link switching procedure 800 using UE-based RRC reconfiguration according to some aspects of the disclosure. A remote UE 802 may have an indirect connection with a first network entity (e.g., first gNB 804) via a first relay UE 806. For example, the remote UE 802 may have an indirect Uu connection 808 with the first gNB 804. The remote UE 802 may be one of the UEs described above in relation to FIG. 3. Based on measurements and/or reports received from the associated UEs, the first gNB 804 can trigger the remote UE 802 to switch to a target relay UE and/or a target gNB.

To initiate the switching, the first gNB 804 can transmit an RRC reconfiguration message (RRCReconfiguration 810) to the remote UE 802. In some aspects, the RRCReconfiguration 810 can trigger the remote UE 802 to perform an RRC re-establishment procedure via a new relay UE or directly with a gNB. In some aspects, the RRCReconfiguration 810 can include timer information for setting up a timer for monitoring indirect links switching operations at the remote UE. The RRCReconfiguration 810 is similar to the RRCReconfiguration 710 described above, and a redundant description of the RRCReconfiguration 810 is omitted.

In response to the RRCReconfiguration 810, the remote UE 802 can evaluate an execution condition 812 for performing a UE-based RRC re-establishment procedure for switching connections with the network. The execution condition can be preconfigured or provided by the RRCReconfiguration 810. In one example, a first execution condition is met when the RSRP of a neighbor relay UE (e.g., relay UE 814) is greater than the serving relay UE (e.g., first relay UE 806) by more than a threshold. In one example, a second execution condition is met when the RSRP of a neighbor relay UE or cell (e.g., gNB) is greater than a first threshold and the RSRP of the serving relay UE is less than a second threshold. In one aspect, the remote UE 802 can consider the execution condition 812 is satisfied if either the first execution condition or the second execution condition is satisfied. In another aspect, the remote UE 802 can consider the execution condition 812 is satisfied if both the first execution condition and the second execution condition are met.

When the execution condition 812 is met, the remote UE 802 can release the current sidelink 816 (e.g., PC5 connection) with the first relay UE 806. Then the remote UE 802 can start a timer 818 and trigger an RRC re-establishment procedure with the target relay UE or gNB. In one example, the RRCReconfiguration 810 can cause the remote UE 802 to perform the RRC re-establishment procedure via a relay UE. In this case, the remote UE 802 can establish a sidelink connection with the target relay UE. For example, the remote UE 802 can perform a unicast PC5 connection establishment procedure 820 to establish a sidelink connection with the target relay UE (e.g., second relay UE 814). After establishing a connection with the target relay UE, the remote UE 802 can perform an RRC re-establishment procedure 822 with a new gNB (e.g., gNB 805) via the relay UE 814. In some aspects, the first relay UE 806 and the second relay UE 814 are served by different gNBs (e.g., gNBs 804 and 805). In some aspects, if the RRCReconfiguration message 810 does not provide information on the target relay UE and/or gNB, the remote UE 802 can trigger the RRC re-establishment procedure via a relay UE or gNB selected by the UE autonomously (i.e., not selected by the gNB).

After successfully establishing a Uu connection 824 with the new gNB 805, the remote UE 802 can stop the running timer 818. Then, the remote UE 802 can obtain UE context from the gNB 805 if RRC re-establishment is successful. If the remote UE 802 cannot re-establish the RRC connection with the gNB before the timer expires, the remote UE 802 can perform a relay UE selection procedure to select a new target relay UE that is not restricted to the relay UE indicated by the RRCReconfiguration 810. At any time, the remote UE 802 can report whether the UE is out of the coverage of the gNB, for example, by sending an RRC message (e.g., a sidelinkUEinformationNR) over a Uu connection if available.

Figure 9:
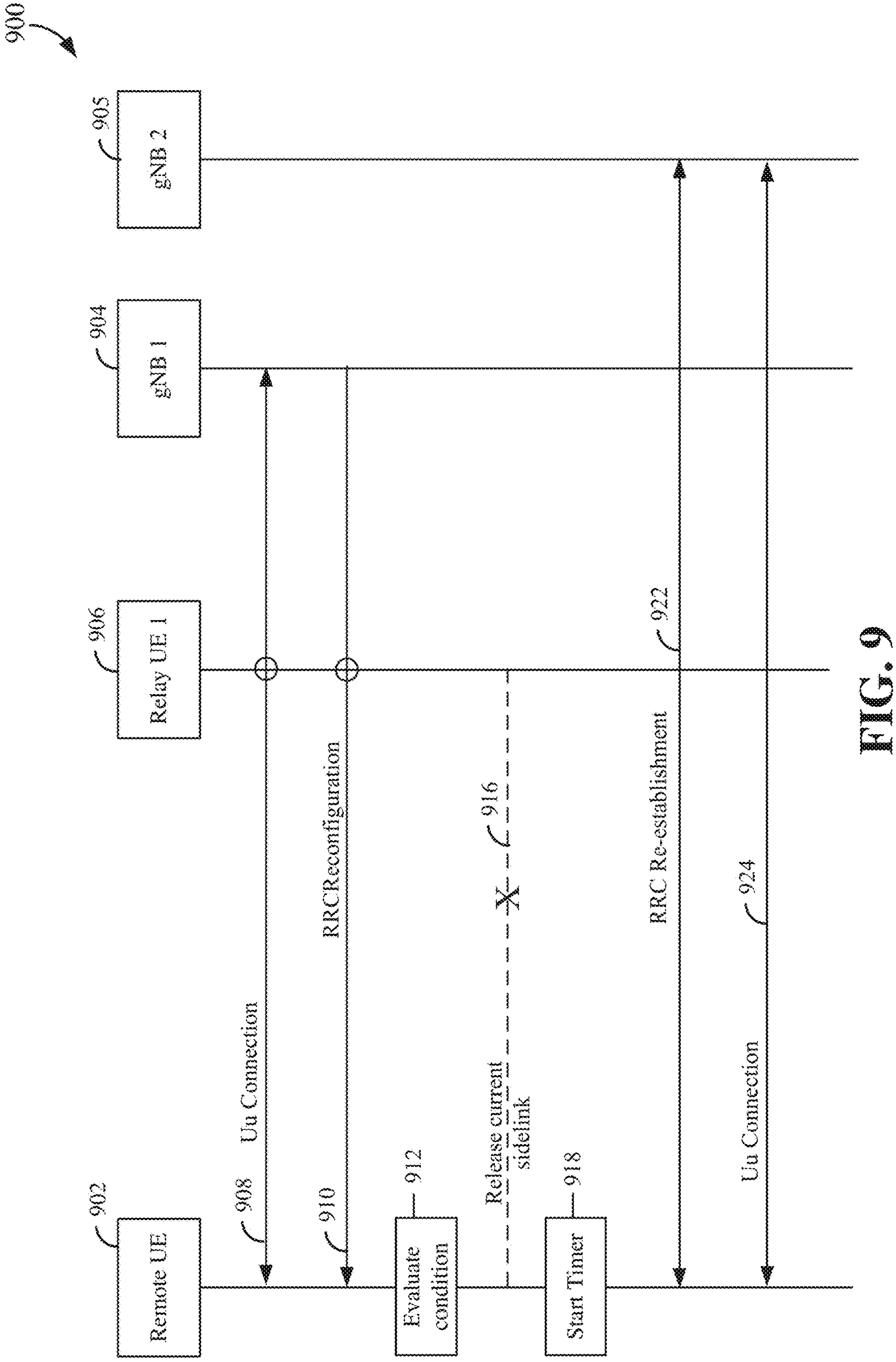
FIG. 9 is a schematic illustration of a third indirect link switching procedure triggered using an RRC reconfiguration message according to some aspects of the disclosure.

FIG. 9 is a schematic illustration of a third indirect link switching procedure 900 using UE-based RRC reconfiguration according to some aspects of the disclosure. A remote UE 902 may have an indirect connection with a network entity (e.g., first gNB 904) via a relay UE 906. For example, the remote UE 902 may have an indirect Uu connection 908 with the first gNB 904 via the relay UE 906. The remote UE 902 may be one of the UEs described above in relation to FIG. 3. Based on measurements and/or reports received from the associated UEs (e.g., remote UE 902 and relay UE 906), the first gNB 904 can trigger the remote UE 902 to switch to a target gNB (e.g., second gNB 905).

To initiate the switching, the first gNB 904 can transmit an RRC reconfiguration message (RRCReconfiguration 910) to the remote UE 902. In some aspects, the RRCReconfiguration 910 can trigger the remote UE 902 to perform an RRC re-establishment procedure via a new relay UE or directly with a gNB. In some aspects, the RRCReconfiguration 910 can include timer information for setting up a timer for monitoring connection switching at the remote UE. The RRCReconfiguration 910 is similar to the RRCReconfiguration message 710 described above, and a redundant description of the RRCReconfiguration 910 can be omitted.

In response to the RRCReconfiguration 910, the remote UE 902 can evaluate an execution condition 912 for performing an RRC re-establishment procedure. The execution condition can be preconfigured or provided by the RRCReconfiguration 910. In one example, a first execution condition is met when the RSRP of a neighbor relay UE is greater than the serving relay UE by more than a threshold. In one example, a second execution condition is met when the RSRP of a neighbor relay UE or cell (e.g., gNB) is greater than a first threshold and the RSRP of the serving relay UE is less than a second threshold. In one aspect, the remote UE 902 can consider the execution condition 912 is satisfied if either the first execution condition or the second execution condition is met. In another aspect, the remote UE 902 can consider the execution condition 912 is satisfied if both the first execution condition and the second execution condition are met.

When the execution condition 912 is met, the remote UE 902 can release the current sidelink 916 (e.g., PC5 connection) with the relay UE 906. Then the remote UE 902 can start a timer 918 and trigger an RRC re-establishment procedure with the target gNB (e.g., gNB 905). For example, the target gNB 905 can have a better RSRP than the relay UE 906. In this case, the RRCReconfiguration 910 can cause the remote UE 902 to perform the RRC re-establishment procedure directly with the new cell/gNB. In some aspects, if the RRCReconfiguration 910 does not provide information on the target relay UE and/or gNB, the remote UE 902 can trigger the RRC re-establishment procedure via a relay UE or gNB selected by the UE autonomously (i.e., not selected by the gNB).

After successfully establishing a Uu connection 924 with the new gNB 905, the remote UE 902 can stop the running timer 918. Then, the remote UE 902 can obtain UE context from the gNB if RRC re-establishment is successful. If the remote UE 902 cannot re-establish the RRC connection with the gNB before the timer expires, the remote UE 902 can perform a relay UE selection procedure to select a new relay UE. At any time, the remote UE 902 can report whether the UE is out of the coverage of the gNB, for example, by sending an RRC message (e.g., a sidelinkUEinformationNR) over a Uu connection if available.

Figure 10:
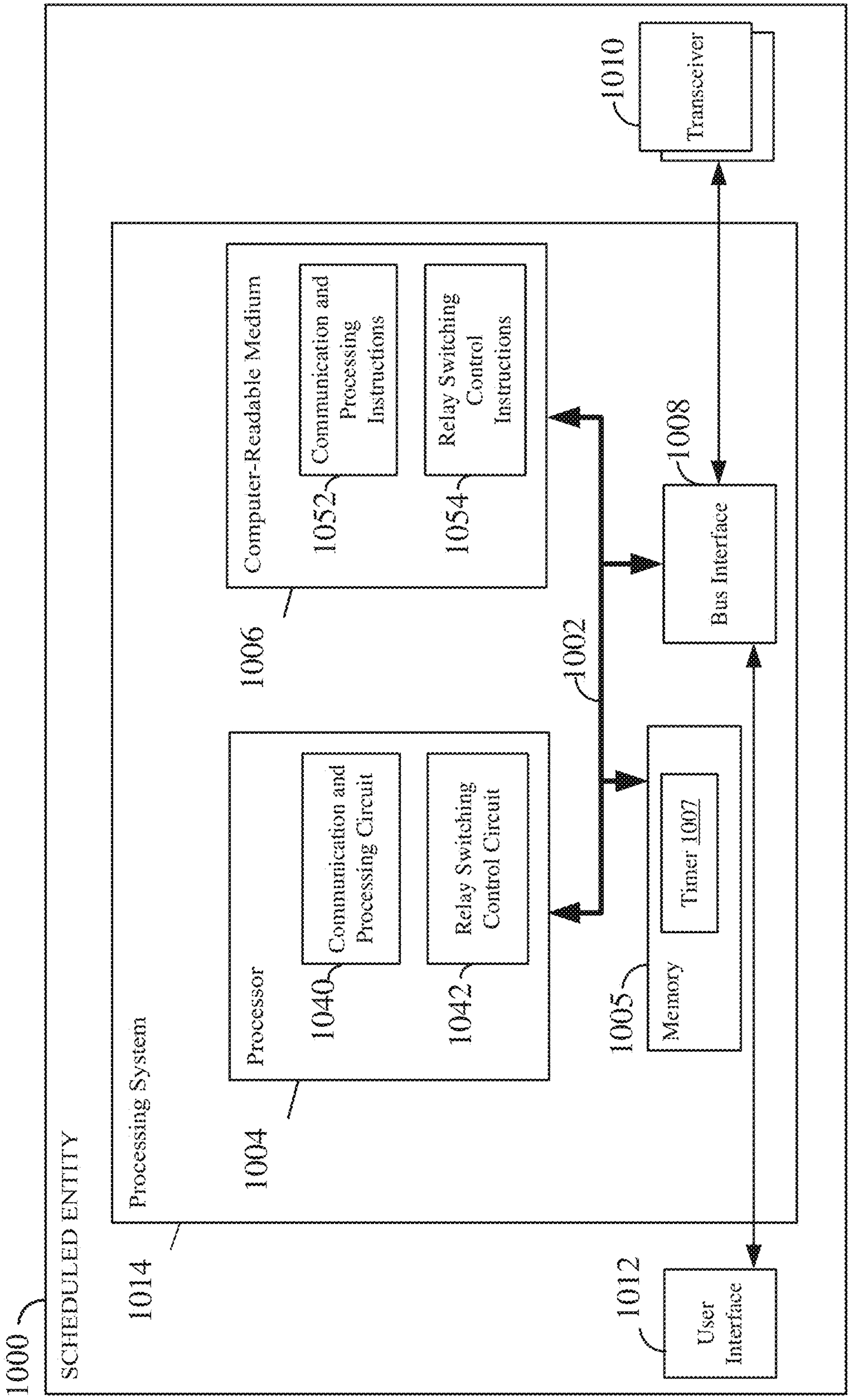
FIG. 10 is a block diagram illustrating an example of a hardware implementation for a scheduled entity according to some aspects of the disclosure.

FIG. 10 is a block diagram illustrating an example of a hardware implementation for a scheduled entity 1000 employing a processing system 1014. For example, the scheduled entity 1000 may be a user equipment (UE) as illustrated in any one or more of FIGS. 1 and 3-9.

The scheduled entity 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 1000 may be configured to perform any one or more of the functions described herein. That is, the processor 1004, as utilized in a scheduled entity 1000, may be used to implement any one or more of the processes and procedures described and illustrated in FIGS. 4-9 and 11.

The processor 1004 may in some instances be implemented via a baseband or modem chip and in other implementations, the processor 1004 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and one or more transceivers 1010. The transceivers 1010 provide a communication interface or means for communicating with various other apparatus over a transmission medium. In some examples, the transceivers 1010 can be configured to communicate with a network entity (e.g., base station, gNB, scheduling entity) using an NR air interface, and one or more remote UEs using a direct link. Examples of direct link include D2D link, sidelink, Bluetooth, Wi-Fi, PC5, etc. Depending upon the nature of the apparatus, a user interface 1012 (e.g., keypad, display, speaker, microphone, joystick, touchscreen) may also be provided. Of course, such a user interface 1012 is optional, and may be omitted in some examples, such as a base station.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006. The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1004 may include circuitry configured for various functions, including, for example, UE-based indirect connection switching procedures. For example, the circuitry may be configured to implement one or more of the functions and procedures described in relation to FIGS. 4-9 and 11.

In some aspects of the disclosure, the processor 1004 may include communication and processing circuitry 1040 configured for various functions, including for example communicating with a network entity (e.g., a scheduling entity, gNB, or base station), or any other entity, such as, for example, one or more sidelink devices. In some examples, the communication and processing circuitry 1040 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1040 may include one or more transmit/receive chains. In addition, the communication and processing circuitry 1040 may be configured to process and transmit uplink traffic and uplink control messages (e.g., PUSCH and PUCCH), receive and process downlink traffic and downlink control messages (e.g., PDSCH and PDCCH), transmit/receive and process sidelink traffic and sidelink control messages. The communication and processing circuitry 1040 may further be configured to execute communication and processing instructions (software) 1052 stored on the computer-readable medium 1006 to implement one or more functions described herein.

In some implementations where the communication involves receiving information, the communication and processing circuitry 1040 may obtain information from a component of the scheduled entity 1000 (e.g., from the transceiver 1010 that receives the information via radio frequency signaling or some other type of signaling suitable for the applicable communication medium), process (e.g., decode) the information, and output the processed information. For example, the communication and processing circuitry 1040 may output the information to another component of the processor 1004, to the memory 1005, or to the bus interface 1008. In some examples, the communication and processing circuitry 1040 may receive one or more of signals, messages, other information, or any combination thereof. In some examples, the communication and processing circuitry 1040 may receive information via one or more channels. In some examples, the communication and processing circuitry 1040 may include functionality for a means for receiving. In some examples, the communication and processing circuitry 1040 may include functionality for a means for processing, including a means for demodulating, a means for decoding, etc.

In some implementations where the communication involves sending (e.g., transmitting) information, the communication and processing circuitry 1040 may obtain information (e.g., from another component of the processor 1004, the memory 1005, or the bus interface 1008), process (e.g., modulate, encode, etc.) the information, and output the processed information. For example, the communication and processing circuitry 1040 may output the information to the transceiver 1010 (e.g., that transmits the information via radio frequency signaling or some other type of signaling suitable for the applicable communication medium). In some examples, the communication and processing circuitry 1040 may send one or more of signals, messages, other information, or any combination thereof. In some examples, the communication and processing circuitry 1040 may send information via one or more channels. In some examples, the communication and processing circuitry 1040 may include functionality for a means for sending (e.g., a means for transmitting). In some examples, the communication and processing circuitry 1040 may include functionality for a means for generating, including a means for modulating, a means for encoding, etc.

In some aspects of the disclosure, the processor 1004 may include relay switching control circuitry 1042 configured for various functions, including for example, UE-based indirect connections switching procedures. In one aspect, the relay switching control circuitry 1042 can be configured to, in response to an RRC connection release message, perform an RRC establishment or RRC re-establishment procedure for switching indirect connections. In one aspect, the relay switching control circuitry 1042 can be configured to, in response to an RRC reconfiguration message, perform an RRC reconfiguration procedure for switching indirect connections. In some aspects, the relay switching control circuitry 1042 can use a timer 1007 to monitor the RRC establishment or RRC re-establishment procedure. The relay switching control circuitry 1042 may further be configured to execute relay switching control instructions (software) 1054 stored on the computer-readable medium 1006 to implement one or more functions described herein.

Figure 11:
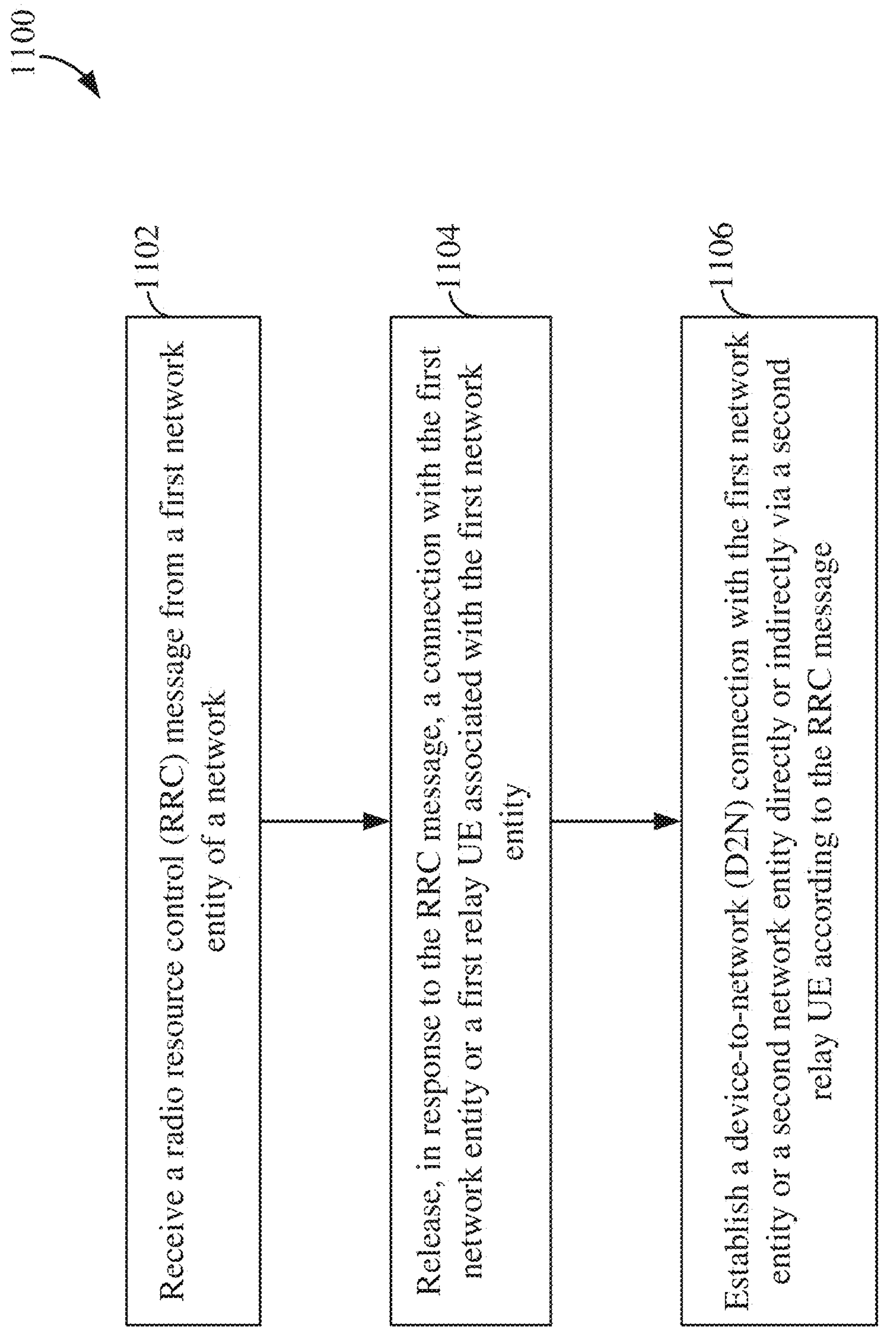
FIG. 11 is a flow chart illustrating an exemplary indirect link switching procedure according to some aspects of the present disclosure.

FIG. 11 is a flow chart illustrating an exemplary indirect link switching procedure 1100 according to some aspects of the present disclosure. As described below, some or all illustrated features may be omitted in a particular implementation within the scope of the present disclosure, and some illustrated features may not be required for implementation of all implementations. In some examples, the procedure 1100 may be carried out by the scheduled entity 1000 illustrated in FIG. 10. In some examples, the procedure 1100 may be carried out by any suitable apparatus or means for carrying out the functions or algorithm described below.

At block 1102, a scheduled entity (e.g., UE) can receive an RRC message from a first network entity of a network. In one aspect, the communication and processing circuitry 1040 can provide a means for receiving the RRC message. In one example, the scheduled entity may be any of the remote UEs 402, 502, 602, 702, 802, and 902 described above in relation to FIGS. 4-9. In one example, the RRC message may be an RRC connection release message (e.g., RRCRelease) as described above in relation to FIGS. 4-6. In one example, the RRC message may be an RRC reconfiguration message (e.g., RRCReconfiguration) as described above in relation to FIGS. 7-9.

At block 1104, in response to the RRC message, the scheduled entity can release a connection with the first network entity or a first relay UE associated with the first network entity. In one aspect, the relay switching control circuitry 1042 can provide a means for releasing a Uu connection with the first network entity (e.g., gNB 606) or a sidelink connection (e.g., PC5) with the first relay UE (e.g., UE 406, 508, 706, 806, or 906).

At block 1106, the scheduled entity can establish a device-to-network (D2N) connection with the first network entity or a second network entity directly or indirectly via a second relay UE according to the RRC message. In one aspect, the relay switching control circuitry 1042 can provide a means for establishing an indirect Uu connection (D2N connection) with the first network entity (e.g., gNB 404, 606, or 704) via the second relay UE (e.g., relay UE 410, 608, or 714). In one aspect, the relay switching control circuitry 1042 can provide a means for establishing an indirect Uu connection with the second network entity (e.g., gNB 518 or 805) via the second relay UE (e.g., relay UE 516 or 814). In one aspect, the relay switching control circuitry

1042 can provide a means for establishing a direct Uu connection with the second network entity (e.g., gNB 905).

In one aspect, the RRC message can include an RRC connection release message (RRCRelease), and the scheduled entity (e.g., remote UE 502, 602, or 702) can trigger, in response to the RRCRelease, an RRC establishment procedure or an RRC re-establishment procedure to establish an RRC connection with the first network entity via the second relay UE, the second network entity via the second relay UE, or the second network entity directly. In one aspect, the RRCRelease can include at least one of: one or more candidate relay UE identifiers; timer information for the RRC establishment procedure or an RRC re-establishment procedure; frequency information of the second relay UE; or cell information of the second relay UE. In one aspect, the scheduled entity can release a sidelink connection with the first relay UE; or release a direct connection with the first network entity.

In one aspect, to establish the D2N connection, the scheduled entity can establish an RRC connection with the first network entity or the second network entity using an RRC establishment procedure or an RRC re-establishment procedure. In one aspect, the scheduled entity can establish a direct connection with the second relay UE for relaying the RRC connection. In one aspect, the scheduled entity can monitor a timer for establishing the D2N connection and trigger a relay selection procedure for selecting a relay UE in response to expiration of the timer. In one aspect, the scheduled entity can determine an availability of the second relay UE prior to releasing the connection with the first relay UE.

In one aspect, the RRC message can include an RRC reconfiguration message (RRCReconfiguration), and the scheduled entity (e.g., remote UE 702, 802, or 902) can trigger, in response to the RRCReconfiguration, an RRC re-establishment procedure to establish the D2N connection with the second network entity directly or via the second relay UE. In one aspect, the RRCReconfiguration can include at least one of: timer information for the RRC re-establishment procedure; one or more candidate relay UE identifiers; one or more candidate network entity identifiers; a condition for triggering the RRC re-establishment procedure; or a priority order for selecting a relay UE or a network entity for the RRC re-establishment procedure. In one aspect, the condition for triggering the RRC re-establishment procedure can include at least one of: a signal quality of the first relay UE; a signal quality of the second relay UE; a signal quality of the first network entity; or a signal quality of the second network entity. In one aspect, the scheduled entity can evaluate the condition for triggering the RRC re-establishment procedure, and trigger the RRC re-establishment procedure based on the condition being satisfied. In one aspect, the scheduled entity can autonomously select a different relay UE or a different network entity excluded from the RRCReconfiguration for the RRC re-establishment procedure. In one aspect, the scheduled entity can fetch a UE context from the network after the establishing the D2N connection.

In one configuration, the apparatus 1000 for wireless communication includes means for performing the above functions described in relation to FIG. 11. In one aspect, the aforementioned means may be the processor(s) 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1 and 3-9, and utilizing, for example, the processes and/or algorithms described herein in relation to FIGS. 4-9 and/or 11.

Figure 12:
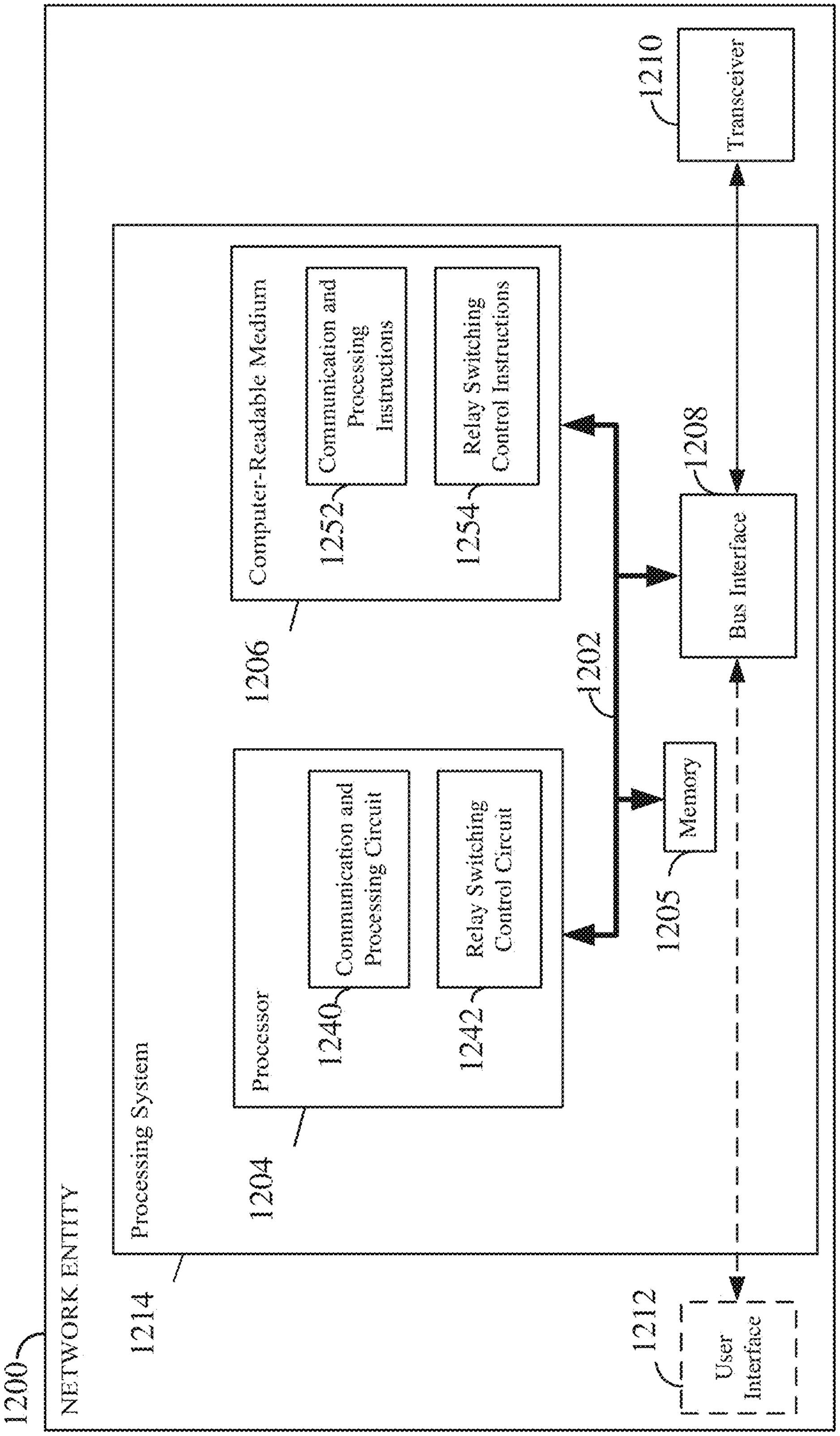
FIG. 12 is a block diagram illustrating an example of a hardware implementation for a network entity according to some aspects of the disclosure.

FIG. 12 is a diagram illustrating an example of a hardware implementation for an exemplary network entity 1200 employing a processing system 1214. In accordance with various aspects of the disclosure, an element, or any portion of an element, or any combination of elements may be implemented with a processing system 1214 that includes one or more processors 1204. For example, the network entity 1200 may be a scheduling entity, a base station, or a gNB as illustrated in any one or more of FIGS. 1 and 3-9.

The processing system 1214 may be substantially the same as the processing system 1014 illustrated in FIG. 10, including a bus interface 1208, a bus 1202, memory 1205, a processor 1204, and a computer-readable medium 1206. Furthermore, the network entity 1200 may include an optional user interface 1212 and a transceiver 1210 substantially similar to those described above in FIG. 10. That is, the processor 1204, as utilized in a network entity 1200, may be used to implement any one or more of the processes described and illustrated in FIGS. 4-9 and 13.

In some aspects of the disclosure, the processor 1204 may include circuitry configured for various functions, including, for example, UE-based indirect connection switching procedures. For example, the circuitry may be configured to implement one or more of the functions and procedures described in relation to FIGS. 4-9 and 13.

In some aspects of the disclosure, the processor 1204 may include communication and processing circuitry 1240 configured for various functions, including for example communicating with one or more scheduled entities (e.g., UEs) directly or indirectly via a relay UE. In some examples, the communication and processing circuitry 1240 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1240 may include one or more transmit/receive chains. In addition, the communication and processing circuitry 1240 may be configured to receive and process uplink traffic and uplink control messages (e.g., PUSCH and PUCCH), process and transmit downlink traffic and downlink control messages (e.g., PDSCH and PDCCH). The communication and processing circuitry 1240 may further be configured to execute communication and processing instructions (software) 1252 stored on the computer-readable medium 1206 to implement one or more functions described herein.

In some implementations where the communication involves receiving information, the communication and processing circuitry 1240 may obtain information from a component of the network entity 1200 (e.g., from the transceiver 1210 that receives the information via radio frequency signaling or some other type of signaling suitable for the applicable communication medium), process (e.g., decode) the information, and output the processed information. For example, the communication and processing circuitry 1240 may output the information to another component of the processor 1204, to the memory 1205, or to the bus interface 1208. In some examples, the communication and processing circuitry 1240 may receive one or more of signals, messages, other information, or any combination thereof. In some examples, the communication and processing circuitry 1240 may receive information via one or more channels. In some examples, the communication and processing circuitry 1240 may include functionality for a means for receiving. In some examples, the communication and processing circuitry 1240 may include functionality for a means for processing, including a means for demodulating, a means for decoding, etc.

In some implementations where the communication involves sending (e.g., transmitting) information, the communication and processing circuitry 1240 may obtain information (e.g., from another component of the processor 1204, the memory 1205, or the bus interface 1208), process (e.g., modulate, encode, etc.) the information, and output the processed information. For example, the communication and processing circuitry 1240 may output the information to the transceiver 1210 (e.g., that transmits the information via radio frequency signaling or some other type of signaling suitable for the applicable communication medium). In some examples, the communication and processing circuitry 1240 may send one or more of signals, messages, other information, or any combination thereof. In some examples, the communication and processing circuitry 1240 may send information via one or more channels. In some examples, the communication and processing circuitry 1240 may include functionality for a means for sending (e.g., a means for transmitting). In some examples, the communication and processing circuitry 1240 may include functionality for a means for generating, including a means for modulating, a means for encoding, etc.

In some aspects of the disclosure, the processor 1204 may include relay switching control circuitry 1242 configured for various functions, including for example UE-based indirect connections switching procedures. In one aspect, the relay switching control circuitry 1242 can be configured to send an RRC connection release message (e.g., RRCRelease) to trigger a remote UE to perform an RRC establishment or RRC re-establishment procedure via another relay UE. In one aspect, the relay switching control circuitry 1242 can be configured to send an RRC reconfiguration message (e.g., RRCReconfiguration) to trigger a remote UE to perform an RRC reconfiguration procedure to switch to another relay connection or direct connection with the network. The relay switching control circuitry 1242 may further be configured to execute relay switching control instructions (software) 1254 stored on the computer-readable medium 1206 to implement one or more functions described herein.

Figure 13:
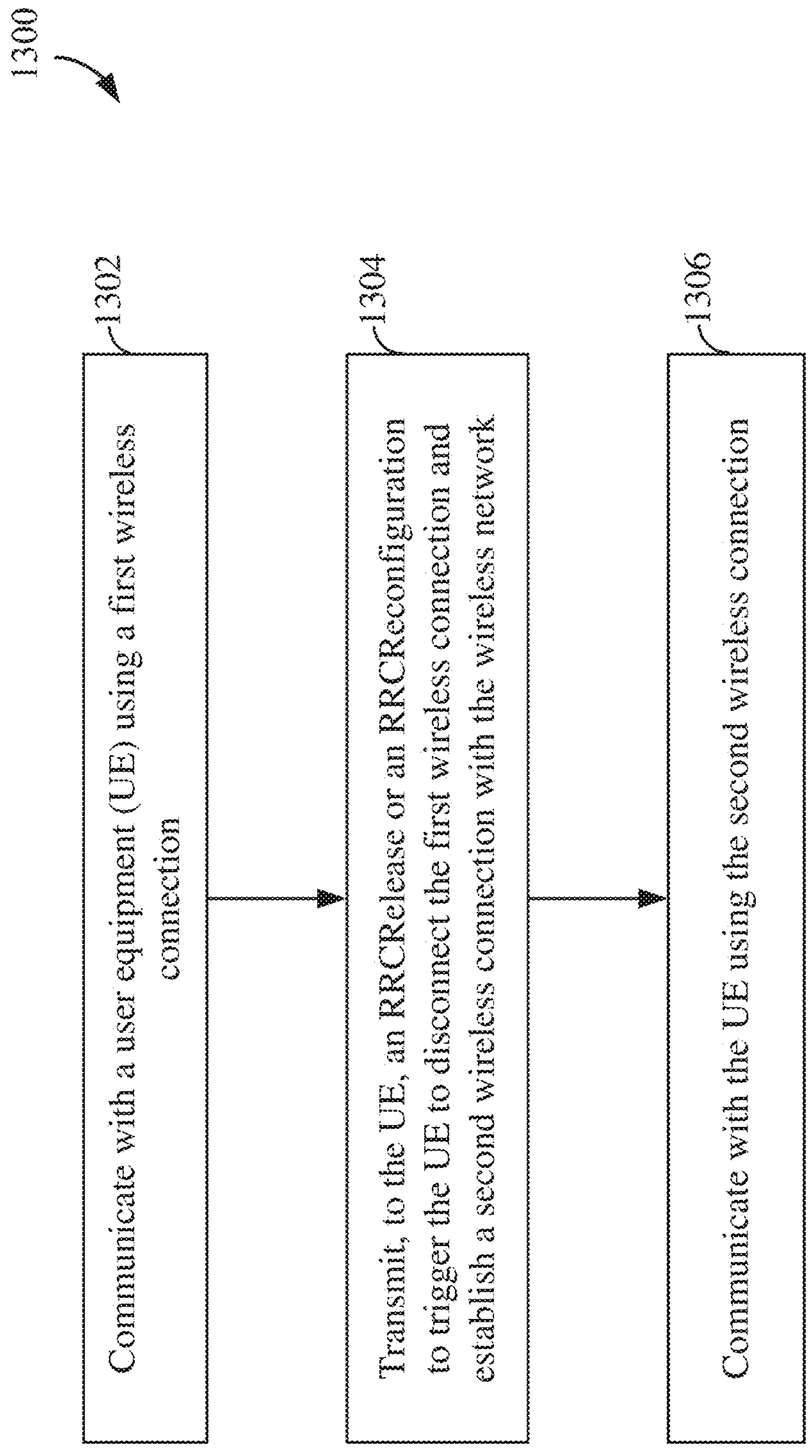
FIG. 13 is a flow chart illustrating an exemplary indirect link switching procedure according to some aspects of the present disclosure.

FIG. 13 is a flow chart illustrating an exemplary indirect link switching procedure 1300 according to some aspects of the disclosure. As described below, some or all illustrated features may be omitted in a particular implementation within the scope of the present disclosure, and some illustrated features may not be required for implementation of all implementations. In some examples, the process 1300 may be carried out by a wireless network including one or more network entities, for example, the network entity 1200 illustrated in FIG. 12. In some examples, the process 1300 may be carried out by any suitable apparatus or means for carrying out the functions or algorithm described below.

At block 1302, the wireless network (a first network entity) can communicate with a UE using a first wireless connection. In one aspect, the communication and processing circuitry 1240 can provide a means for communicating with the UE using the first wireless connection. In one example, the UE may be any of UEs 402, 502, 602, 702, 802, and 902 described above in relation to FIGS. 4-9. In one example, the first wireless connection may be a direct Uu connection or an indirect Uu connection via a first relay UE.

At block 1304, the wireless network can transmit an RRCRelease or RRCReconfiguration to the UE. In one aspect, the relay switching control circuitry 1242 can provide a means for transmitting the RRCRelease or RRCReconfiguration to the UE via the transceiver 1210 as described above in relation to FIGS. 4-9. The RRCRelease or RRCReconfiguration can trigger the UE to disconnect the first wireless connection and establish a second wireless connection with the wireless network (the first network entity or a second network entity).

At block 1306, the wireless network can communicate with the UE using the second wireless connection. In one aspect, the communication and processing circuitry 1240 can provide a means for communicating with the UE using the second wireless connection. In one example, the second wireless connection may be a direct Uu connection or an indirect Uu connection via a second relay UE that is different from the first UE.

In one aspect, the RRCRelease can include at least one of: one or more candidate relay UE identifiers; timer information for performing an RRC establishment procedure or an RRC re-establishment procedure to establish the second wireless connection; frequency information of a relay UE; or cell information of a relay UE. In one aspect, the wireless network can establish the second wireless connection with the UE using an RRC establishment procedure or an RRC re-establishment procedure in response to the RRCRelease. In one aspect, the network can establish the second wireless connection with the UE using a relay UE indicated by the RRCRelease. In one aspect, the RRCReconfiguration can include at least one of: timer information for performing an RRC re-establishment procedure to establish the second wireless connection; one or more candidate relay UE identifiers; one or more candidate network entity identifiers; a condition for triggering the RRC re-establishment procedure; or a priority order for selecting a relay UE or a network entity for the RRC re-establishment procedure. In one aspect, the condition for triggering the RRC re-establishment procedure can include at least one of: a signal quality of the first relay UE; a signal quality of the second relay UE; a signal quality of the first network entity; or a signal quality of the second network entity.

In one configuration, the apparatus 1200 for wireless communication includes means for performing the above functions described in relation to FIG. 13. In one aspect, the aforementioned means may be the processor(s) 1204 shown in FIG. 12 configured to perform the functions recited by the aforementioned means. In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1 and 3-9, and utilizing, for example, the processes and/or algorithms described herein in relation to FIGS. 4-9 and/or 13.

A first aspect of the disclosure provides a method of wireless communication at a user equipment (UE), including: receiving a radio resource control (RRC) message from a first network entity of a network or a sidelink message from a first relay UE associated with the first network entity; releasing, in response to the RRC message or the sidelink message, a connection with the first network entity or the first relay UE associated with the first network entity; and establishing a device-to-network (D2N) connection with the first network entity or a second network entity directly or indirectly via a second relay UE according to the RRC message.

A second aspect of the disclosure, alone or in combination of the first aspect, the method further includes: transmitting coverage status information to the first network entity, wherein the coverage status information indicates whether the UE is out-of-coverage of the first network entity.

A third aspect of the disclosure, alone or in combination of any of the first to second aspects, wherein the sidelink message indicates that the sidelink message is triggered by a cell reselection, a handover, or a radio link failure occurred at the first relay UE.

A fourth aspect of the disclosure, alone or in combination of any of the first to third aspects, wherein the RRC message includes an RRC connection release message (RRCRelease), and the method further includes: triggering, in response to the RRCRelease, an RRC establishment procedure or an RRC re-establishment procedure to establish an RRC connection with the first network entity via the second relay UE, the second network entity via the second relay UE, or the second network entity directly.

A fifth aspect of the disclosure, alone or in combination of the fourth aspect, wherein the RRCRelease includes at least one of: one or more candidate relay UE identifiers; timer information for the RRC establishment procedure or an RRC re-establishment procedure; a priority order for selecting a relay UE or a network entity for the RRC establishment procedure or an RRC re-establishment procedure; frequency information of the second relay UE; or cell information of the second relay UE.

A sixth aspect of the disclosure, alone or in combination of any of the first to fifth aspects, wherein the releasing the connection includes: releasing a sidelink connection with the first relay UE; or releasing a direct connection with the first network entity.

A seventh aspect of the disclosure, alone or in combination of any of the first to sixth aspects, wherein the establishing the D2N connection includes: starting a timer associated with establishing the D2N connection; establishing an RRC connection with the first network entity or the second network entity using an RRC establishment procedure or an RRC re-establishment procedure; and stopping the timer after establishing the D2N connection.

An eighth aspect of the disclosure, alone or in combination of any of the first to seventh aspects, the method further includes: selecting the second relay UE based on at least one of radio strength, priority, or higher layer criteria of a plurality of candidate relay UEs indicated in the RRC message; and establishing a direct connection with the selected second relay UE for relaying the RRC connection.

A ninth aspect of the disclosure, alone or in combination of any of the first to eighth aspects, the method further includes: monitoring a timer for establishing the D2N connection; and triggering a relay selection procedure for selecting a relay UE in response to expiration of the timer.

A tenth aspect of the disclosure, alone or in combination of any of the first to ninth aspects, the method further includes determining an availability of the second relay UE prior to releasing the connection with the first relay UE.

An eleventh aspect of the disclosure, alone or in combination of any of the first to third aspects, wherein the RRC message includes an RRC reconfiguration message (RRCReconfiguration), and further comprising: triggering, in response to the RRCReconfiguration, an RRC re-establishment procedure to establish the D2N connection with the second network entity directly or via the second relay UE.

A twelfth aspect of the disclosure, alone or in combination of the eleventh aspect, wherein the RRCReconfiguration includes at least one of: timer information for the RRC re-establishment procedure; one or more candidate relay UE identifiers; one or more candidate network entity identifiers; a condition for triggering the RRC re-establishment procedure; or a priority order for selecting a relay UE or a network entity for the RRC re-establishment procedure.

A thirteenth aspect of the disclosure, alone or in combination of the twelfth aspect, wherein the condition for triggering the RRC re-establishment procedure comprises at least one of: a signal quality of the first relay UE; a signal quality of the second relay UE; a signal quality of the first network entity; or a signal quality of the second network entity.

A fourteenth aspect of the disclosure, alone or in combination of any of the twelfth to thirteenth aspects, the method further includes: evaluating the condition for triggering the RRC re-establishment procedure; starting a timer associated with establishing the D2N connection; triggering the RRC re-establishment procedure based on the condition being satisfied; and stopping the timer after establishing the D2N connection.

A fifteenth aspect of the disclosure, alone or in combination of any of the eleventh to fourteenth aspects, the method further includes: autonomously selecting a different relay UE or a different network entity excluded from the RRCReconfiguration for the RRC re-establishment procedure.

A sixteenth aspect of the disclosure, alone or in combination of any of the first to fifteenth aspects, the method further includes fetching a UE context from the network after the establishing the D2N connection.

A seventeenth aspect of the disclosure provides a method of wireless communication at a wireless network. The method includes communicating with a user equipment (UE) using a first wireless connection; transmitting, to the UE, a radio resource control (RRC) connection release message (RRCRelease) or an RRC reconfiguration message (RRCReconfiguration) to trigger the UE to disconnect the first wireless connection and establish a second wireless connection with the wireless network; and communicating with the UE using the second wireless connection.

An eighteenth aspect of the disclosure, alone or in combination of the seventeenth aspect, the method further includes: receiving coverage status information from the UE, wherein the coverage status information indicates whether the UE is out-of-coverage of the wireless network.

A nineteenth aspect of the disclosure, alone or in combination of any of the seventeenth to eighteenth aspects, wherein the RRCRelease includes at least one of: one or more candidate relay UE identifiers; timer information for performing an RRC establishment procedure or an RRC re-establishment procedure to establish the second wireless connection; a priority order for selecting a relay UE or a network entity for the RRC establishment procedure or an RRC re-establishment procedure; frequency information of a relay UE; or cell information of a relay UE.

A twentieth aspect of the disclosure, alone or in combination of any of the seventeenth to nineteenth aspects, the method further includes: establishing the second wireless connection with the UE using an RRC establishment procedure or an RRC re-establishment procedure in response to the RRCRelease.

A twenty-first aspect of the disclosure, alone or in combination of any of the seventeenth to twentieth aspects, the method further includes establishing the second wireless connection with the UE using a relay UE indicated by the RRCRelease.

A twenty-second aspect of the disclosure, alone or in combination of any of the seventeenth to twenty-first aspects, wherein the RRCReconfiguration includes at least one of: timer information for performing an RRC re-establishment procedure to establish the second wireless connection; one or more candidate relay UE identifiers; one or more candidate network entity identifiers; a condition for triggering the RRC re-establishment procedure; or a priority order for selecting a relay UE or a network entity for the RRC re-establishment procedure.

A twenty-third aspect of the disclosure, alone or in combination of the twenty-second aspect, wherein the condition for triggering the RRC re-establishment procedure includes at least one of: a signal quality of the relay UE; or a signal quality of the network entity.

A twenty-fourth aspect of the disclosure provides a user equipment (UE) for wireless communication, the UE includes: a communication interface configured for wireless communication; a memory; and a processor connected with the communication interface and the memory, wherein the processor and the memory are configured to: receive a radio resource control (RRC) message from a first network entity of a network or a sidelink message from a first relay UE associated with the first network entity; and release, in response to the RRC message or the sidelink message, a connection with the first network entity or the first relay UE associated with the first network entity; and establish a device-to-network (D2N) connection with the first network entity or a second network entity directly or indirectly via a second relay UE according to the RRC message.

A twenty-fifth aspect of the disclosure, alone or in combination of the twenty-fourth aspect, wherein the processor and the memory are further configured to: transmit coverage status information to the first network entity, wherein the coverage status information indicates whether the UE is out-of-coverage of the first network entity.

A twenty-sixth aspect of the disclosure, alone or in combination of any of the twenty-fourth to twenty-fifth aspects, wherein the sidelink message indicates that the sidelink message is triggered by a cell reselection, a handover, or a radio link failure occurred at the first relay UE.

A twenty-seventh aspect of the disclosure, alone or in combination of any of the twenty-fourth to twenty-sixth aspects, wherein the RRC message includes an RRC connection release message (RRCRelease), and wherein the processor and the memory are further configured to: trigger, in response to the RRCRelease, an RRC establishment procedure or an RRC re-establishment procedure to establish an RRC connection with the first network entity via the second relay UE, the second network entity via the second relay UE, or the second network entity directly.

A twenty-eighth aspect of the disclosure, alone or in combination of the twenty-seventh aspect, wherein the RRCRelease includes at least one of: one or more candidate relay UE identifiers; timer information for the RRC establishment procedure or an RRC re-establishment procedure; a priority order for selecting a relay UE or a network entity for the RRC establishment procedure or an RRC re-establishment procedure; frequency information of the second relay UE; or cell information of the second relay UE.

A twenty-ninth aspect of the disclosure, alone or in combination of any of the twenty-fourth to twenty-seventh aspects, wherein, for releasing the connection, the processor and the memory are further configured to: release a sidelink connection with the first relay UE; or release a direct connection with the first network entity.

A thirtieth aspect of the disclosure, alone or in combination of any of the twenty-fourth to twenty-ninth aspects, wherein for establishing the D2N connection, the processor and the memory are further configured to: start a timer associated with establishing the D2N connection; establish an RRC connection with the first network entity or the second network entity using an RRC establishment procedure or an RRC re-establishment procedure; and stop the timer after establishing the D2N connection.

A thirty-first aspect of the disclosure, alone or in combination of any of the twenty-fourth to thirtieth aspects, wherein the processor and the memory are further configured to: select the second relay UE based on at least one of radio strength, priority, or higher layer criteria of a plurality of candidate relay UEs indicated in the RRC message; and establish a direct connection with the selected second relay UE for relaying the RRC connection.

A thirty-second aspect of the disclosure, alone or in combination of any of the twenty-fourth to thirty-first aspects, wherein the processor and the memory are further configured to: monitor a timer for establishing the D2N connection; and trigger a relay selection procedure for selecting a relay UE in response to expiration of the timer.

A thirty-third aspect of the disclosure, alone or in combination of any of the twenty-fourth to thirty-second aspects, wherein the processor and the memory are further configured to: determine an availability of the second relay UE prior to releasing the connection with the first relay UE.

A thirty-fourth aspect of the disclosure, alone or in combination of the twenty-fourth aspect, wherein the RRC message includes an RRC reconfiguration message (RRCReconfiguration), and the processor and the memory are further configured to: trigger, in response to the RRCReconfiguration, an RRC re-establishment procedure to establish the D2N connection with the second network entity directly or via the second relay UE.

A thirty-fifth aspect of the disclosure, alone or in combination of the thirty-fourth aspect, wherein the RRCReconfiguration includes at least one of: timer information for the RRC re-establishment procedure; one or more candidate relay UE identifiers; one or more candidate network entity identifiers; a condition for triggering the RRC re-establishment procedure; or a priority order for selecting a relay UE or a network entity for the RRC re-establishment procedure.

A thirty-sixth aspect of the disclosure, alone or in combination of the thirty-fifth aspect, wherein the condition for triggering the RRC re-establishment procedure includes at least one of: a signal quality of the first relay UE; a signal quality of the second relay UE; a signal quality of the first network entity; or a signal quality of the second network entity.

A thirty-seventh aspect of the disclosure, alone or in combination of any of the thirty-fifth to thirty-sixth aspects, wherein the processor and the memory are further configured to: evaluate the condition for triggering the RRC re-establishment procedure; start a timer associated with establishing the D2N connection; trigger the RRC re-establishment procedure based on the condition being satisfied; and stop the timer after establishing the D2N connection.

A thirty-eighth aspect of the disclosure, alone or in combination of any of the thirty-fourth to thirty-seventh aspects, wherein the processor and the memory are further configured to: autonomously select a different relay UE or a different network entity excluded from the RRCReconfiguration for the RRC re-establishment procedure.

A thirty-ninth aspect of the disclosure, alone or in combination of any of the thirty-fourth to thirty-eighth aspects, wherein the processor and the memory are further configured to:

fetch a UE context from the network after the establishing the D2N connection.

A fortieth aspect of the disclosure provides a network entity of a wireless network, the network entity includes: a communication interface for wireless communication; a memory; and a processor connected with the communication interface and the memory. The processor and the memory are configured to: communicate with a user equipment (UE) using a first wireless connection; transmit, to the UE, a radio resource control (RRC) connection release message (RRCRelease) or an RRC reconfiguration message (RRCReconfiguration) to trigger the UE to disconnect the first wireless connection and establish a second wireless connection with the wireless network; and communicate with the UE using the second wireless connection.

A forty-first aspect of the disclosure, alone or in combination of the fortieth aspect, wherein the processor and the memory are further configured to: receive coverage status information from the UE, wherein the coverage status information indicates whether the UE is out-of-coverage of the wireless network.

A forty-second aspect of the disclosure, alone or in combination of any of the fortieth to forty-first aspects, wherein the RRCRelease includes at least one of: one or more candidate relay UE identifiers; timer information for performing an RRC establishment procedure or an RRC re-establishment procedure to establish the second wireless connection; a priority order for selecting a relay UE or a network entity for the RRC establishment procedure or an RRC re-establishment procedure; frequency information of a relay UE; or cell information of a relay UE.

A forty-third aspect of the disclosure, alone or in combination of any of the fortieth to forty-second aspects, wherein the processor and the memory are configured to: establish the second wireless connection with the UE using an RRC establishment procedure or an RRC re-establishment procedure in response to the RRCRelease.

A forty-fourth aspect of the disclosure, alone or in combination of any of the fortieth to forty-third aspects, wherein the processor and the memory are further configured to: establish the second wireless connection with the UE using a relay UE indicated by the RRCRelease.

A forty-fifth aspect of the disclosure, alone or in combination of any of the fortieth to forty-second aspects, wherein the RRCReconfiguration includes at least one of: timer information for performing an RRC re-establishment procedure to establish the second wireless connection; one or more candidate relay UE identifiers; one or more candidate network entity identifiers; a condition for triggering the RRC re-establishment procedure; or a priority order for selecting a relay UE or a network entity for the RRC re-establishment procedure.

A forty-sixth aspect of the disclosure, alone or in combination of the forty-fifth aspect, wherein the condition for triggering the RRC re-establishment procedure includes at least one of: a signal quality of the relay UE; or a signal quality of the network entity.

A forty-seventh aspect of the disclosure provides a user equipment (UE) for wireless communication. The UE includes means for receiving a radio resource control (RRC) message from a first network entity of a network or a sidelink message from a first relay UE associated with the first network entity; means for releasing, in response to the RRC message or the sidelink message, a connection with the first network entity or the first relay UE associated with the first network entity; and means for establishing a device-to-network (D2N) connection with the first network entity or a second network entity directly or indirectly via a second relay UE according to the RRC message.

A forty-eighth aspect of the disclosure provides a network entity of a wireless network. The network entity includes means for communicating with a user equipment (UE) using a first wireless connection; means for transmitting, to the UE, a radio resource control (RRC) connection release message (RRCRelease) or an RRC reconfiguration message (RRCReconfiguration) to trigger the UE to disconnect the first wireless connection and establish a second wireless connection with the wireless network; and means for communicating with the UE using the second wireless connection.

A forty-ninth aspect of the disclosure provides a computer-readable storage medium stored with executable code for wireless communication. The executable code instructions for causing a user equipment (UE) to: receive a radio resource control (RRC) message from a first network entity of a network or a sidelink message from a first relay UE associated with the first network entity; release, in response to the RRC message or the sidelink message, a connection with the first network entity or the first relay UE associated with the first network entity; and establish a device-to-network (D2N) connection with the first network entity or a second network entity directly or indirectly via a second relay UE according to the RRC message.

A fiftieth aspect of the disclosure provides a computer-readable storage medium stored with executable code for wireless communication in a wireless network. The executable code includes instructions for causing a network entity to: communicate with a user equipment (UE) using a first wireless connection; transmit, to the UE, a radio resource control (RRC) connection release message (RRCRelease) or an RRC reconfiguration message (RRCReconfiguration) to trigger the UE to disconnect the first wireless connection and establish a second wireless connection with the wireless network; and communicate with the UE using the second wireless connection.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication at a user equipment (UE), comprising:

receiving redirection information in a radio resource control (RRC) message using a first connection with a wireless network via a first relay UE, wherein the redirection information comprises a priority order for selecting a relay UE;

releasing, in response to the RRC message, the first connection with the wireless network; and establishing a second connection with the wireless network according to the redirection information.

2. The method of claim 1, further comprising:

transmitting coverage status information to a first network entity of the wireless network, wherein the coverage status information indicates whether the UE is out-of-coverage of the first network entity.

3. The method of claim 1, wherein the RRC message comprises a sidelink message that is triggered by a cell reselection, a handover, or a radio link failure that occurred at the first relay UE.

4. The method of claim 1, wherein the RRC message comprises an RRC connection release message (RRCRelease), and further comprising:

triggering, in response to the RRCRelease, an RRC establishment procedure or an RRC re-establishment procedure to establish an RRC connection with the wireless network directly or via a second relay UE, wherein the redirection information further comprises at least one of:

one or more candidate relay UE identifiers;

timer information for the RRC establishment procedure or an RRC re-establishment procedure;

a priority order for selecting a network entity for the RRC establishment procedure or an RRC re-establishment procedure;

frequency information of a relay UE; or cell information of a relay UE.

5. The method of claim 1, wherein the establishing the second connection comprises:

starting a timer associated with establishing the second connection;

establishing an RRC connection with the wireless network using an RRC establishment procedure or an RRC re-establishment procedure; and stopping the timer after establishing the second connection.

6. The method of claim 5, further comprising:

selecting a relay UE based on at least one of radio strength, priority, or higher layer criteria of a plurality of candidate relay UEs indicated in the redirection information; and establishing a direct connection with the selected relay UE for relaying the RRC connection.

7. The method of claim 1, wherein the RRC message comprises an RRC reconfiguration message (RRCReconfiguration), and further comprising:

triggering, in response to the RRCReconfiguration, an RRC re-establishment procedure to establish the second connection with a network entity directly or via a second relay UE, wherein the redirection information further comprises at least one of:

timer information for the RRC re-establishment procedure;

one or more candidate relay UE identifiers;

one or more candidate network entity identifiers;

a condition for triggering the RRC re-establishment procedure; or a priority order for selecting a network entity for the RRC re-establishment procedure.

8. A method of wireless communication at a wireless network, comprising:

communicating with a remote user equipment (UE) using a first wireless connection via a relay UE;

transmitting, to the remote UE, redirection information in a radio resource control (RRC) message to trigger the remote UE to disconnect the first wireless connection and establish a second wireless connection with the wireless network, wherein the redirection information comprises a priority order for selecting a relay UE; and communicating with the remote UE using the second wireless connection according to the redirection information.

9. The method of claim 8, wherein the redirection information further comprises at least one of:

one or more candidate relay UE identifiers;

timer information for performing an RRC establishment procedure or an RRC re-establishment procedure to establish the second wireless connection;

a priority order for selecting a network entity for the RRC establishment procedure or an RRC re-establishment procedure;

frequency information of the relay UE; or cell information of the relay UE.

10. A user equipment (UE) for wireless communication, comprising:

a memory; and one or more processors connected with the memory, the one or more processors being configured to:

receive redirection information in a radio resource control (RRC) message using a first connection with a wireless network via a first relay UE, wherein the redirection information comprises a priority order for selecting a relay UE;

release, in response to the RRC message, the first connection with the wireless network; and establish a second connection with the wireless network according to the redirection information.

11. The UE of claim 10, wherein the one or more processors are further configured to:

transmit coverage status information to a first network entity of the wireless network, wherein the coverage status information indicates whether the UE is out-of-coverage of the first network entity.

12. The UE of claim 10, wherein the RRC message comprises a sidelink message that is triggered by a cell reselection, a handover, or a radio link failure that occurred at the first relay UE.

13. The UE of claim 10, wherein the RRC message comprises an RRC connection release message (RRCRelease), and wherein the one or more processors are further configured to:

trigger, in response to the RRCRelease, an RRC establishment procedure or an RRC re-establishment procedure to establish an RRC connection with the wireless network directly or via a second relay UE according to the redirection information.

14. The UE of claim 13, wherein the redirection information further comprises at least one of:

one or more candidate relay UE identifiers;

timer information for the RRC establishment procedure or an RRC re-establishment procedure;

a priority order for selecting a network entity for the RRC establishment procedure or an RRC re-establishment procedure;

frequency information of a relay UE; or cell information of a relay UE.

15. The UE of claim 10, wherein, for releasing the first connection, the one or more processors are further configured to:

release a sidelink connection with the first relay UE.

16. The UE of claim 10, wherein for establishing the second connection, the one or more processors are further configured to:

start a timer associated with establishing the second connection;

establish an RRC connection with the wireless network using an RRC establishment procedure or an RRC re-establishment procedure; and stop the timer after establishing the second connection.

17. The UE of claim 16, wherein the one or more processors are further configured to:

select a relay UE based on at least one of radio strength, priority, or higher layer criteria of a plurality of candidate relay UEs indicated in the RRC message; and establish a direct connection with the selected relay UE for relaying the RRC connection.

18. The UE of claim 10, wherein the one or more processors are further configured to:

monitor a timer for establishing the second connection; and trigger a relay selection procedure for selecting a relay UE in response to expiration of the timer.

19. The UE of claim 10, wherein the one or more processors are further configured to:

determine an availability of a relay UE according to the redirection information prior to releasing the first connection with the first relay UE.

20. The UE of claim 10, wherein the RRC message comprises an RRC reconfiguration message (RRCReconfiguration), and the one or more processors are further configured to:

trigger, in response to the RRCReconfiguration, an RRC re-establishment procedure to establish the second connection with a network entity directly or via a second relay UE according to the redirection information.

21. The UE of claim 20, wherein the redirection information further comprises at least one of:

timer information for the RRC re-establishment procedure;

one or more candidate relay UE identifiers;

one or more candidate network entity identifiers;

a condition for triggering the RRC re-establishment procedure; or a priority order for selecting a network entity for the RRC re-establishment procedure.

22. The UE of claim 21, wherein the one or more processors are further configured to:

evaluate the condition for triggering the RRC re-establishment procedure;

start a timer associated with establishing the second connection;

trigger the RRC re-establishment procedure based on the condition being satisfied; and stop the timer after establishing the second connection.

23. The UE of claim 20, wherein the one or more processors are further configured to:

autonomously select a different relay UE or a different network entity excluded from the RRCReconfiguration for the RRC re-establishment procedure.

24. The UE of claim 10, wherein the one or more processors are further configured to:

fetch a UE context from the wireless network after the establishing the second connection.

25. A network entity of a wireless network, comprising:

a memory; and one or more processors connected with the memory, the one or more processors being configured to:

communicate with a remote user equipment (UE) using a first wireless connection via a relay UE;

transmit, to the remote UE, redirection information in a radio resource control (RRC) message to trigger the remote UE to disconnect the first wireless connection and establish a second wireless connection with the wireless network, wherein the redirection information comprises a priority order for selecting a relay UE; and communicate with the remote UE using the second wireless connection according to the redirection information.

26. The network entity of claim 25, wherein the one or more processors are further configured to:

receive coverage status information from the remote UE, wherein the coverage status information indicates whether the remote UE is out-of-coverage of the wireless network.

27. The network entity of claim 25, wherein the redirection information further comprises at least one of:

one or more candidate relay UE identifiers;

timer information for performing an RRC establishment procedure or an RRC re-establishment procedure to establish the second wireless connection;

a priority order for selecting a network entity for the RRC establishment procedure or an RRC re-establishment procedure;

frequency information of the relay UE; or cell information of the relay UE.

28. The network entity of claim 25, wherein the one or more processors are configured to:

establish the second wireless connection with the UE using an RRC establishment procedure or an RRC re-establishment procedure in response to the RRC message.

29. The network entity of claim 28, wherein the one or more processors are further configured to:

establish the second wireless connection with the UE using a relay UE indicated by the redirection information.

30. The network entity of claim 25, wherein the redirection information further comprises at least one of:

timer information for performing an RRC re-establishment procedure to establish the second wireless connection;

one or more candidate relay UE identifiers;

one or more candidate network entity identifiers;

a condition for triggering a RRC re-establishment procedure; or a priority order for selecting a network entity for a RRC re-establishment procedure.

* * * * *